(12) United States Patent
Weber

(10) Patent No.: US 6,330,555 B1
(45) Date of Patent: Dec. 11, 2001

(54) METHOD AND APPARATUS FOR ENABLING A VIEW OF DATA ACROSS A DATABASE

(75) Inventor: Rick Weber, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/253,103

(22) Filed: Feb. 19, 1999

(51) Int. Cl.$^7$ ................................................. G06F 17/30
(52) U.S. Cl. ............................ 707/2; 707/9; 707/10; 709/203
(58) Field of Search ..................... 705/30–44; 707/1, 707/2, 9, 10; 709/203

(56) References Cited

U.S. PATENT DOCUMENTS

| | | | |
|---|---|---|---|
| 5,544,358 | * | 8/1996 | Capps et al. .................. 707/523 |
| 5,659,738 | * | 8/1997 | Letkeman et al. .............. 707/102 |
| 5,737,591 | * | 4/1998 | Kaplan et al. .................... 707/1 |
| 5,809,501 | * | 9/1998 | Noven ............................... 707/7 |
| 5,903,878 | * | 5/1999 | Talati et al. ..................... 705/26 |
| 5,937,396 | * | 8/1999 | Konya ............................. 705/43 |
| 5,940,843 | * | 8/1999 | Zucknovich .................... 707/516 |
| 5,963,925 | * | 10/1999 | Kolling et al. ................... 705/40 |
| 6,016,484 | * | 1/2000 | Williams et al. ................. 705/39 |
| 6,149,055 | * | 11/2000 | Gatto ............................. 235/379 |
| 6,157,954 | * | 12/2000 | Moon et al. .................... 709/228 |

* cited by examiner

Primary Examiner—John Breene
Assistant Examiner—Cheryl Lewis
(74) Attorney, Agent, or Firm—Blakely Sokoloff Taylor & Zafman, LLP

(57) ABSTRACT

A method, apparatus and article of manufacture for enabling a view of data across a database. A database containing data to be viewed is received by the system. The database is logically partitioned into a partition based upon a characteristic of the data to be viewed, the partition having a partition viewage table and a set of objects. An entry point is defined in the database for the view of data, the entry point having an entry point viewage table. The view of data is enabled by generating a set of partitions by recursively following the entry point viewage table and the partition viewage table to referenced partitions.

30 Claims, 21 Drawing Sheets

```
                    ┌─301                              ┌─307
class Database {                        class ViewageTableEntry {
const char *id;                         const char *target_database_id;
ViewageTable *table;                    const char *target_partition_id;
Dictionary<const char *> partitions;    };
Dictionary<int> notification_addresses;
};
                    ┌─303                              ┌─309
class Partition {                       class DatabaseObject {
const char *id;                         const char *id;
ViewageTable *table;                    Set partitions;
Set database_objects;                   Set related_database_objects;
};                                      };
                    ┌─305                              ┌─311
class ViewageTable {                    class PartitionsInView {
Set viewage_table_entries;              Dictionary<const char *> partitions;
};                                      Dictionary<const char *> databases;
                                        };
```

FIG. 3

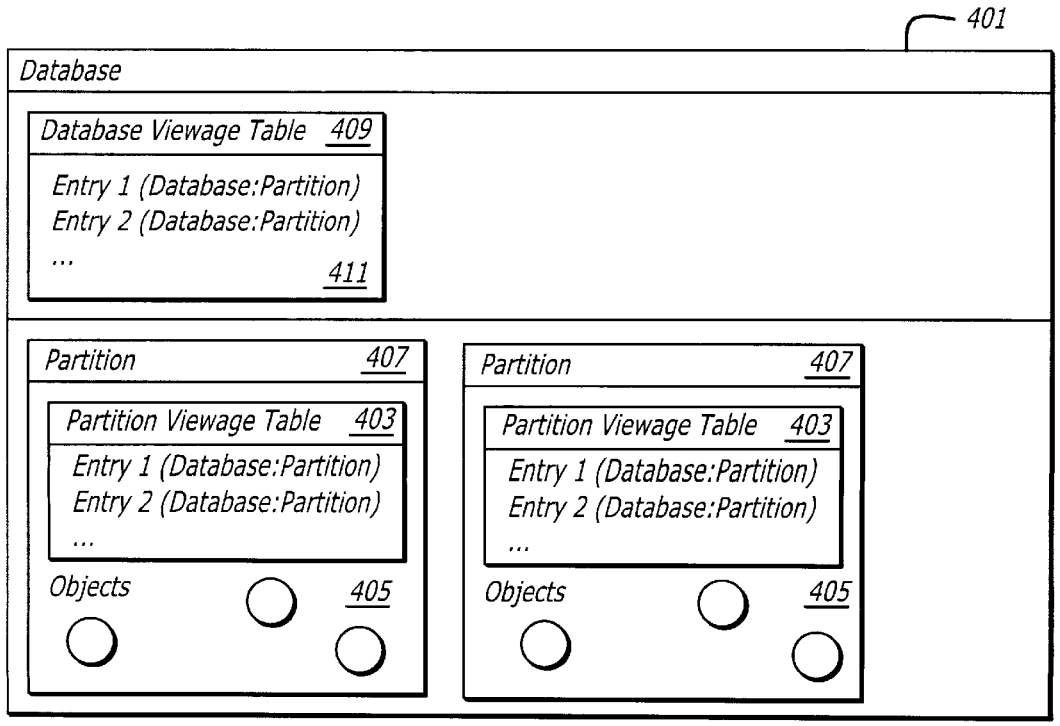

FIG. 4

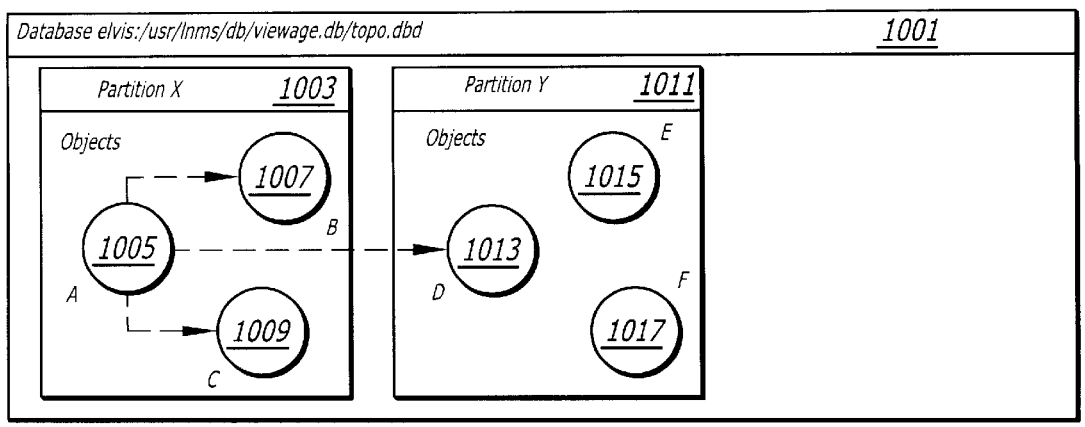
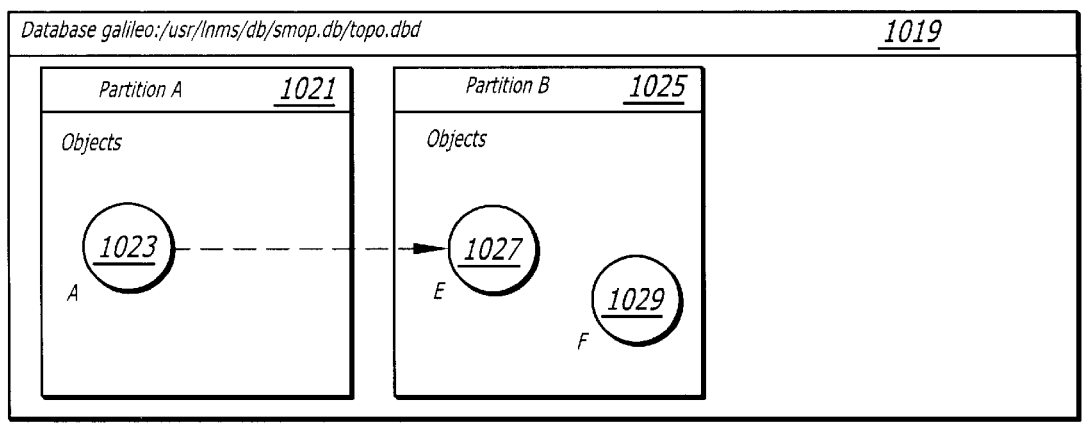
FIG. 10
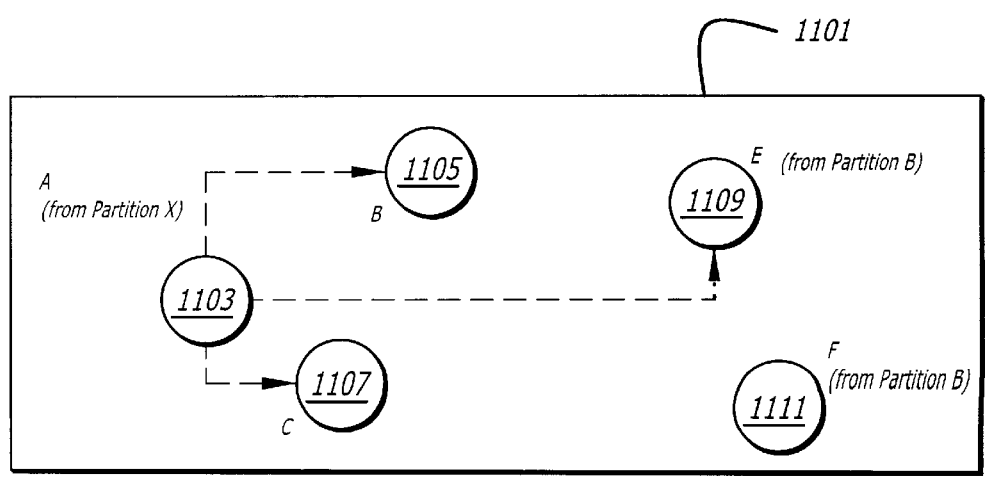
FIG. 11

```
class Database {
const char *id;
ViewageTable *table;
Dictionary<const char *> partitions;
Dictionary<int> notification_addresses;
};
```
— 1401

```
class Notification {
int type;
void *address;
const char *data;
Set partitions_in_view;
};
```
— 1403

METHOD AND APPARATUS FOR ENABLING A VIEW OF DATA ACROSS A DATABASE

This patent application is related to the co-pending U.S. patent application Ser. No. 09/251,895, filed on Feb. 19, 1999, pending which is assigned to the assignee of the present invention.

FIELD OF THE INVENTION

This invention relates generally to computer databases, and more particularly, to a method and apparatus for enabling a view of data across a database.

BACKGROUND OF THE INVENTION

Multiple computer databases or databases with multiple partitions pose special problems for database designers. In many cases, it is desirable to have a set of databases that hold all data, but where each user of the system has a unique view into that data. Stated another way, each user would have access to just a subset of all available data. However, database designers are limited by software applications that each require the appearance of a single database.

In computer networking environments which store network topology information, one problem is to maintain multiple, independent databases where each single network topology database is located on a physically distinct machine. Topology processes on each machine typically write to their own database and are not aware of each other. To accommodate current software applications, the databases must have the appearance of a single database or single datascape to maintain backward compatibility and eliminate the need for special applications to handle multiple databases explicitly.

When displaying network information to system users, a union of all data in view must be formed across the multiple databases, resolving duplicated and/or missing data. To give the appearance that the data came from a single, self-consistent database, the resulting datascape typically must be uniform, logically consistent, and homogeneous. In addition, information must be gathered from multiple databases in an efficient and seamless manner.

Therefore, there is a need for a way to implement multiple computer databases or databases with multiple partitions where a single, unique view is presented to each user of the system. There is a further need to have the database appear as a single database to software applications. There is a further need to gather information from databases in an efficient and seamless manner.

SUMMARY OF THE INVENTION

The present invention provides a method, apparatus and article of manufacture for enabling a view of data across a database. A database containing data to be viewed is received by the system. The database is logically partitioned into a partition based upon a characteristic of the data to be viewed, the partition having a partition viewage table and a set of objects. An entry point is defined in the database for the view of data, the entry point having an entry point viewage table. The view of data is enabled by generating a set of partitions by recursively following the entry point viewage table and the partition viewage table to referenced partitions.

BRIEF DESCRIPTION OF THE DRAWINGS

The present invention is illustrated by way of example and may be better understood by referring to the following description in conjunction with the accompanying drawings, in which like references indicate similar elements and in which:

FIG. 3 shows database viewage data structures compatible with the present invention;

FIG. 4 shows database components compatible with the present invention;

FIG. 10 shows multiple databases, objects, and object relationships compatible with the present invention;

FIG. 11 shows a presented view compatible with the present invention;

DETAILED DESCRIPTION OF AN EMBODIMENT OF THE INVENTION

In the following description of an embodiment, reference is made to the accompanying drawings which form a part hereof, and in which is shown by way of illustration a specific embodiment in which the disclosed technology may be practiced. It is to be understood that other embodiments may be utilized and structural changes may be made without departing from the scope of the disclosed technology. An embodiment of the disclosed technology, described below, enables a remote computer system user to execute a software application on a network file server.

The disclosed technology provides a way for enabling a view of data across a database. A database containing data to be viewed is received by the system. The database is logically partitioned into a partition based upon a characteristic of the data to be viewed, the partition having a partition viewage table and a set of objects. An entry point is defined in the database for the view of data, the entry point having an entry point viewage table. The view of data is enabled by generating a set of partitions by recursively following the entry point viewage table and the partition viewage table to referenced partitions.

Figure 1:
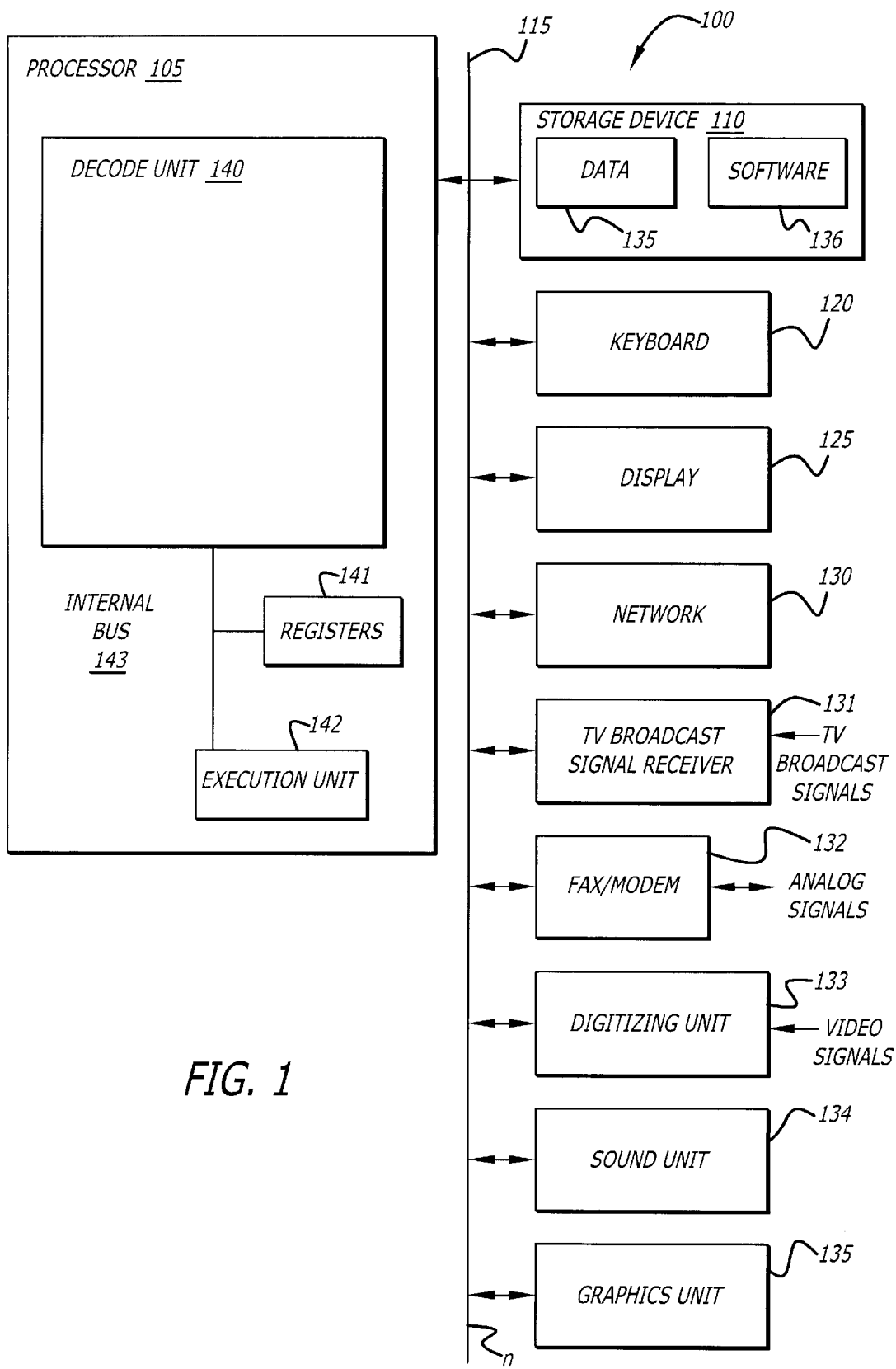
FIG. 1 shows system diagram which shows a computer hardware environment compatible with the present invention.

FIG. 1 illustrates one embodiment of a computer system 100 which may be used with the disclosed technology. Computer system 100 comprises a processor 105, a storage device 110, and a bus 115. The processor 105 is coupled to the storage device 110 by the bus 115. In addition, a number of user input/output devices, such as a keyboard 120 and a display 125, are also coupled to the bus 115. The processor 105 represents a central processing unit of any type of architecture, such as CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single processor computer system, the technology could be implemented in a multi-processor computer system.

In addition to other devices, one or more of a network 130, a TV broadcast signal receiver 131, a fax/modem 132, a digitizing unit 133, a sound unit 134, and a graphics unit 135 may optionally be coupled to bus 115. The network 130 and fax modem 132 represent one or more network connections for transmitting data over a machine readable media (e.g., carrier waves). The digitizing unit 133 represents one or more devices for digitizing images (i.e., a scanner, camera, etc.). The sound unit 134 represents one or more devices for inputting and/or outputting sound (e.g., microphones, speakers, magnetic storage devices, optical storage devices, etc.). The graphics unit 135 represents one or more devices for generating 3-D images (e.g., graphics card).

FIG. 1 also illustrates that the storage device 110 has stored therein data 135 and software 136. Data 135 represents data stored in one or more of the formats described herein. Software 136 represents the necessary code for performing any and/or all of the techniques described herein. It will be recognized by one of ordinary skill in the art that the storage device 110 preferably contains additional software (not shown), which is not necessary to understanding the disclosed technology.

FIG. 1 additionally illustrates that the processor 105 includes decode unit 140, a set of registers 141, and execution unit 142, and an internal bus 143 for executing instructions. It will be recognized by one of ordinary skill in the art that the processor 105 contains additional circuitry, which is not necessary to understanding the disclosed technology. The decode unit 140, registers 141 and execution unit 142 are coupled together by internal bus 143. The decode unit 140 is used for decoding instructions received by processor 105 into control signals and/or microcode entry nodes. In response to these control signals and/or microcode entry nodes, the execution unit 142 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the disclosed technology.

The registers 141 represent a storage are on processor 105 for storing information, including control/status information, integer data, floating node data, and packed data. It will be understood by one of ordinary skill in the art that one aspect of the disclosed technology is the described instruction set for operating on packed data. According to this aspect of the disclosed technology, the storage area used for storing the packed data is not critical. The term data processing system is used herein to refer to any machine for processing data, including the computer systems(s) described with reference to FIG. 1.

In one embodiment of the disclosed technology, each user of the system is enabled to have access to a unique subset of all available data, referred to as a view of data, where that data resides in one or more physical databases. Unique views, referred to as viewage, are preferably achieved by placing each datum object into a logical partition and associating each view or user with a set of partitions. The set of objects in a view is then typically equal to the set of objects or object associated with all partitions, associated with a given view. Viewage relates to the object filtering mechanism of the disclosed technology. The disclosed technology takes all the data that may exist in multiple physical databases and potentially reduces the scope of the data defined by viewage and presents the data to applications typically as a single homogenous datascape.

Figure 2:
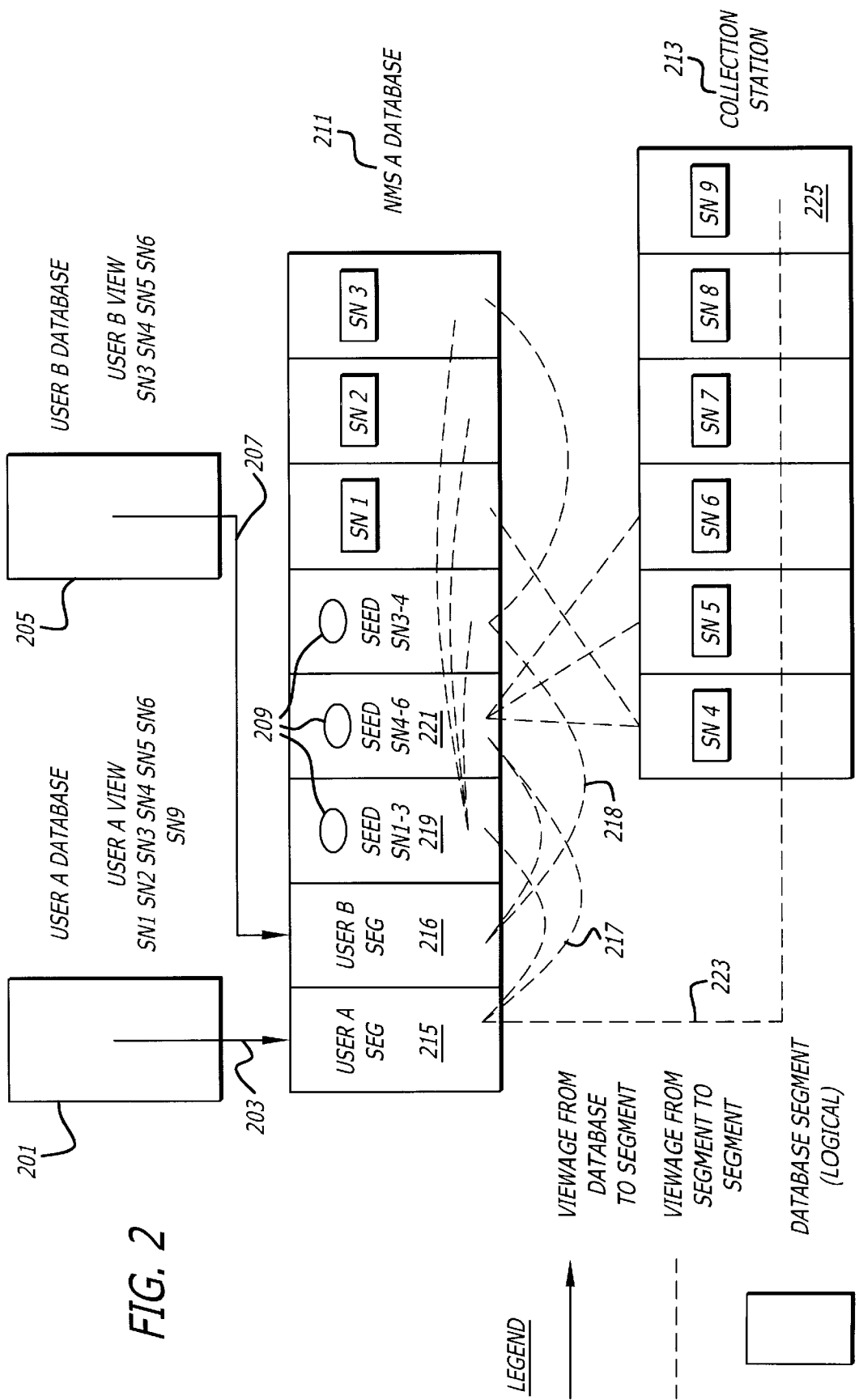
FIG. 2 shows a recursive viewage example compatible with the present invention.

As shown in FIG. 2, the unit of viewage is the partition. A user A database 201 includes a viewage 203 of a first partition 215, and a user B database 205 includes a viewage 207 of a second partition 216. A number of objects 209 may be associated with a partition. An object may be any typical network object, including but not limited to a router, hub, switch, bridge, network, partition, workstation, server, agent, link, local area network, wide area network, probe, modem, ATM circuit, VLAN, switch, community, or subnet. If a particular partition is in view, then all its associated objects are in view also. If a partition is not in view, then its objects are ignored. However, each object may be associated with multiple partitions, so in fact this means that a given object is in view if any of its partitions are in view. For the example shown in FIG. 2, the user A database 201 includes a viewage 203 of user A partition 215 in the first database 211. The user A partition 215 includes viewage links 217, 218, 223 to other partitions in a database. Viewage link 217 includes partition 219 in the first database 211, viewage link 218 includes partition 221 in the first database 211, and viewage link 223 includes partition 225 in the second database 213.

In practice, viewage is typically set up by a partition-aware application or applications, and then all other applications need not be partition aware at all. These latter applications simply perform all the usual application program interface (API) calls against a certain source database, and the system performs filtering to return only those objects which happen to be in view. In this sense, most applications only know and care about their own data models, but do not know or care about partitions or the number of databases at all.

Viewage may also be used for alternative data modeling mechanisms, e.g. as a convenient way to partition data.

Viewage can be used as the basis of any number of distribution, partitioning, or viewage schemes. One embodiment of the disclosed technology uses viewage as the basis of subnet-based viewage.

Viewage has several purposes inside the disclosed technology: It defines all the partitions that are in view of a given source such as a user database, it defines all the databases that are in view, and it is used as the basis of object filtering.

FIG. 3 shows an example of database viewage data structures compatible with the disclosed technology. The example classes and fields shown in FIG. 3 may be defined as given below.

Database class: A database class 301 represents a single physical database. A database class preferably has a globally-unique identifier and contains a PartitionViewageTable and a set of Partitions. The fields of the database class 301 may be defined as given below.

const char*id: A database ID uniquely identifies the database. The database ID is preferably composed of a host identifier such as a host name or IP address, followed by the colon character, followed by the pathname to the database. One example compatible with an embodiment of the disclosed technology is: "elvis:/usr/lnms/db/smop.db/topo.dbd".

ViewageTable*table: A database viewage table represents a one-to-one containment relationship; the database contains a single viewage table.

Dictionary<const char*> partitions: A Dictionary is a commonly-used type of set that associates an object with a key. In one embodiment of the disclosed technology, the dictionary represents a one-to-many containment relationship where the database contains partitions. Each partition is keyed by the partition identifier (a const char*field).

Dictionary<int> notification_addresses: A Dictionary is a data structure which can hold a set of integers, each integer corresponding to a specific Notification type.

Partition class: A partition class 303 represents a partition inside a database. Each partition belongs to one database, and contains a unique identifier within the scope of the database. Each partition also contains a PartitionViewageTable and a set of objects. The fields of the partition class 303 may be defined as given below.

const char*id: A partition ID uniquely identifies the partition within the database. There is no required format.

ViewageTable*table: A partition viewage table represents a one-to-one containment relationship; the partition contains a single viewage table.

Set database_objects: A set of database objects represents a many-to-many containment relationship between the partition and its associated DatabaseObjects. A Set is a commonly-used type of collection that contains a number of items. In an example compatible with an embodiment of the disclosed technology, a given partition can have any number of contained DatabaseObjects, and each object can be contained by one or more partitions.

ViewageTable class: A viewage table class 305 contains a set of table entries, and each entry uniquely identifies a partition in a database. This class is used to compute viewage, which is the total set of all partitions in view. The fields of the viewage table class 305 may be defined as given below.

Set viewage_table_entries: A set of viewage table entries represents a one-to-many containment relationship, where a ViewageTable contains a set of ViewageTableEntry objects.

ViewageTableEntry class: A viewage table entry class 307 represents a viewage entry that uniquely identifies a target partition in a target database. The fields of the viewage table entry class 307 may be defined as given below.

const char*target_database_id: The Database ID of the target database.

const char*target_partition_id: The Partition ID of the target partition within the target database.

DatabaseObject class: A database object class 309 generically represents data that is externally useful. In one embodiment of the disclosed technology, all externally useful data is composed of a single database object class. In general, any number of different data types may be used, as long as a many-to-many relationship can be established between each DatabaseObject and one or more Partitions. The fields of the database object class 309 may be defined as given below.

const char*id: The database object ID identifies a DatabaseObject, and is preferably unique within a Database.

Set partitions: A set of partitions represents a many-to-many relationship between each DatabaseObject and one or more Partitions.

Set related_database_objects: A set of related database objects represents a many-to-many relationship between each DatabaseObject and other DatabaseObjects. This is used to model relationships between objects.

PartitionsInView class: A partitions in view class 311 typically contains a list of all partitions in view of a given starting ViewageTable, as well as a corresponding list of databases. This list is used to determine if a given DatabaseObject, Partition, and/or Database is in view or not. Note: This class is not held internally to a Database but is derived from ViewageTable entries. The fields the partitions in view class 311 may be defined as given below.

Dictionary<const char*> partitions: Contains a set of Partitions in view, accessible by Partition ID.

Dictionary<const char*> databases: Contains a set of Databases in view, accessible by Database ID.

FIG. 4 shows an example of database components compatible with the disclosed technology. The example database components shown in FIG. 4 are explained in greater detail below.

The database 401 preferably contains a single ViewageTable object 409 and a set of partition database objects 405 for each partition object 407.

The database viewage table 409 is illustrated with a set of entries 411, each uniquely identifying a partition in this or some other database with a combination of database ID and partition ID.

There may generally be zero or more partitions in a database. However, in one embodiment of the disclosed technology, one partition is always created when a database is initialized having a Partition ID set to "Default". In this embodiment, where all database objects must be associated with at least one partition, it makes no sense to have no partitions in a database. There is generally no upper limit on how many partitions can be in a database.

The following discussion applies equally to Database Viewage Tables and to Partition Viewage Tables. There may generally be zero or more entries in a ViewageTable. Zero entries is a valid condition and means that there are no partitions in view of this ViewageTable. There is generally no upper limit on how many entries can be in a viewage table.

There must be a least one database in the system, which may be referred to as the originating database. There may be any number of other databases whose partitions are identified by viewage table entries in the originating database. There is generally no upper limit on the number of databases.

Viewage refers to the set of partitions in view of an origination point. This is important because a view determines what objects can be accessed. A set of partitions implies the set of all objects associated with those partitions. As described above, any objects not associated with any partition in a view are thus not accessible.

An origination point of a view can be any Viewage Table. In one embodiment of the disclosed technology, the origination point is always the Database Viewage Table of a database. Unique views are created by having a separate database per view, and each database has a unique Database Viewage Table which establishes the viewage for that database. In such an embodiment, because the system must have a separate view per user, a separate database is established for each user of the system, each database containing a unique per-user viewage table.

One aspect of viewage is data partitioning, e.g. deciding how many partitions to create, and how many objects and what types of objects to put in a partition. Several examples of data partitioning are described below.

Topology data. In one embodiment, the disclosed technology collects and stores large amounts of network topology data collected via SNMP and other means. However, each user typically wants to see only a subset of the entire data. The representation of each subnet is typically placed in its own database partition; thus the subnet object plus all objects hierarchically below the subnet such as switches, bridges, and concentrators are all associated with the same database partition. If a given network object such as a concentrator is associated with more than one subnet, then the corresponding data object is associated with multiple corresponding partitions in the database. Each user's view is then associated with a subset of all available partitions.

Configuration data. This type of data is frequently application-specific or task-specific. In these cases, each application or task typically creates its own partition in a common database and creates objects in that partition.

Endnode data. End-nodes such as workstations are typically stored in a separate database, partitioned by concentrator. A given concentrator partition containing all the end-node objects associated with the concentrator is typically set up to be in view of the topology partition which contains the concentrator object. Thus, if a given concentrator is in view, so are all of its endnodes.

Figure 5A:
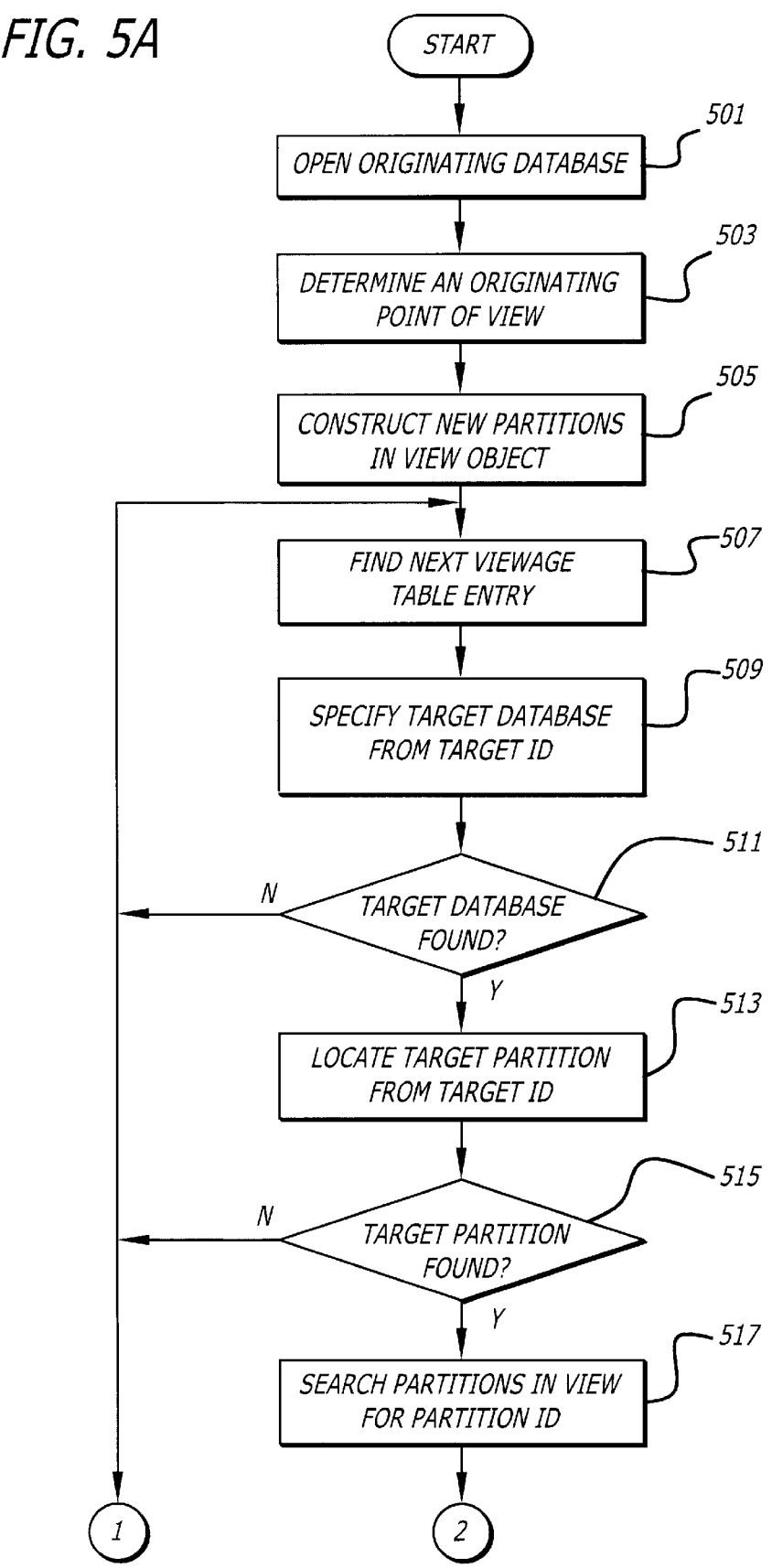
FIGS. 5A–5B show a flowchart of an example method for determining a view compatible with the present invention.
Figure 5B:
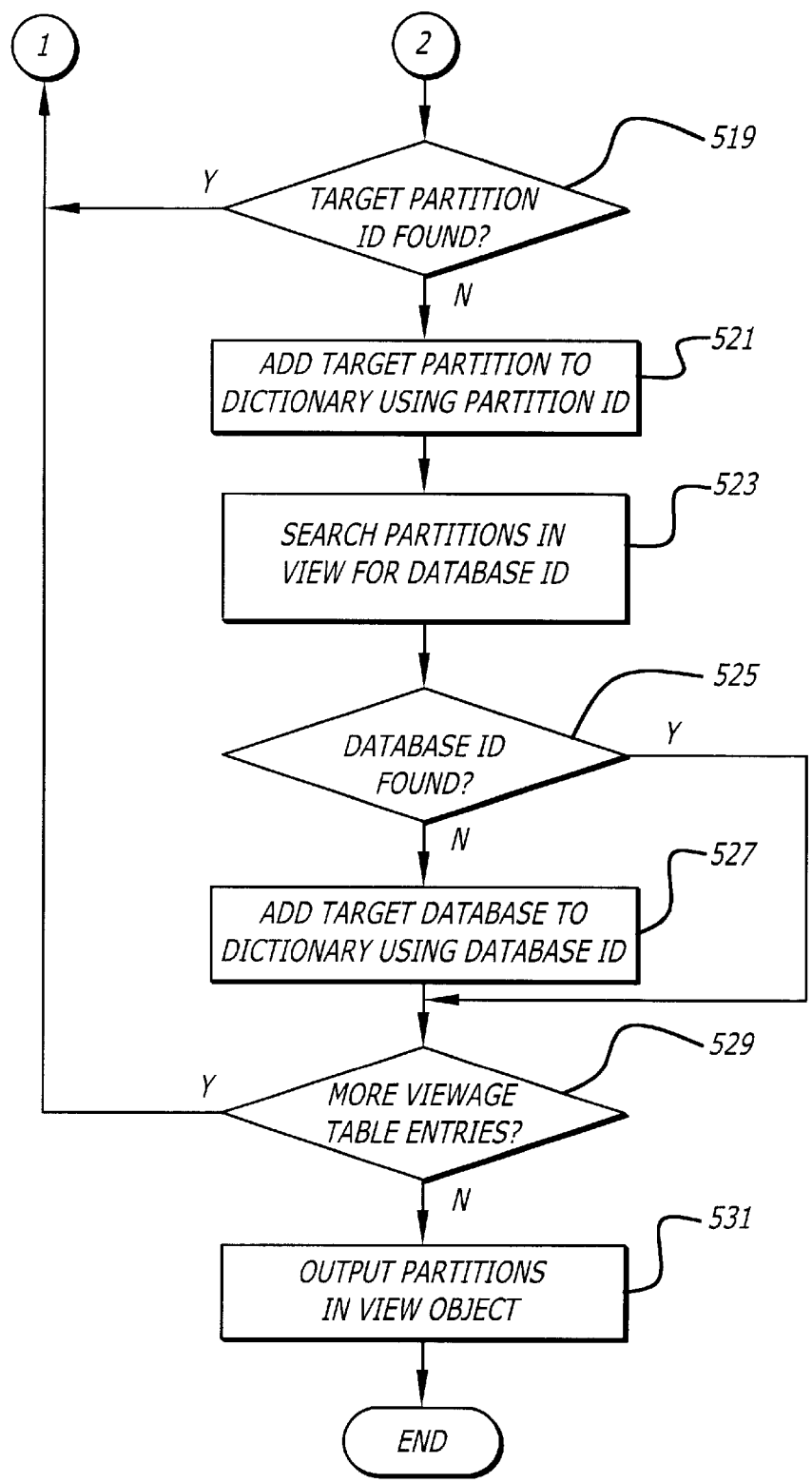

An example method for determining a view is given in FIGS. 5A–5B. At step 501, an originating database is opened. At step 503, an originating point of view is determined. In one embodiment, the originating point of a view is always the Database Viewage Table of the originating database. This is referred to as the Originating Viewage Table. At step 505, a new Partitions InView object is constructed, initially containing no data.

At step 507, the next ViewageTableEntry is found. For each ViewageTableEntry in the Originating Viewage Table, at step 509 the target database is specified by the target database ID in the entry. The database is opened and the Database object inside the target database is located.

At step 511, if the target database is not found, the ViewageTableEntry is ignored and control returns to 507.

At step 513, a target partition is located as specified by the target partition ID. The target partition is contained in the target database. The target partition is found by using the Dictionary of partitions in the target Database object, looking up the partition by the partition ID specified in the entry.

At step 515, if the partition is not found, the ViewageTableEntry is ignored and control returns to 507.

At step 517, the Dictionary of partitions in the PartitionsInView object is searched. If at step 519 a target partition ID is found, the ViewageTableEntry is ignored and control returns to 507. Otherwise, at step 521 the target Partition object is added to the Dictionary using the target partition ID as the key.

At step 523, the Dictionary of databases in the PartitionsInView object is searched. If at 525 a database ID is not found because the Dictionary of databases does not contain an entry for the target database ID, at 527 the target Database object is added to the Dictionary using the target database ID as the key.

If at step 529, there is another ViewageTableEntry in the Partition Viewage Table, control returns to 507. Otherwise, at step 531, the PartitionsInView object is output.

The result of the above-described method is a single PartitionsInView object that contains both a Dictionary of all Partition objects in view and a Dictionary of all Databases in view. This is how a view is represented. This embodiment forces each partition in view to have a unique partition ID in order to simplify partition ID-based lookup of partitions in view. It will be recognized by one of ordinary skill in the art that alternative embodiments which do not force a unique partition ID may be used with the disclosed technology without loss of generality.

Given a View as described above, it is determined which DatabaseObject objects representing externally useful data are in that view.

Figure 6:
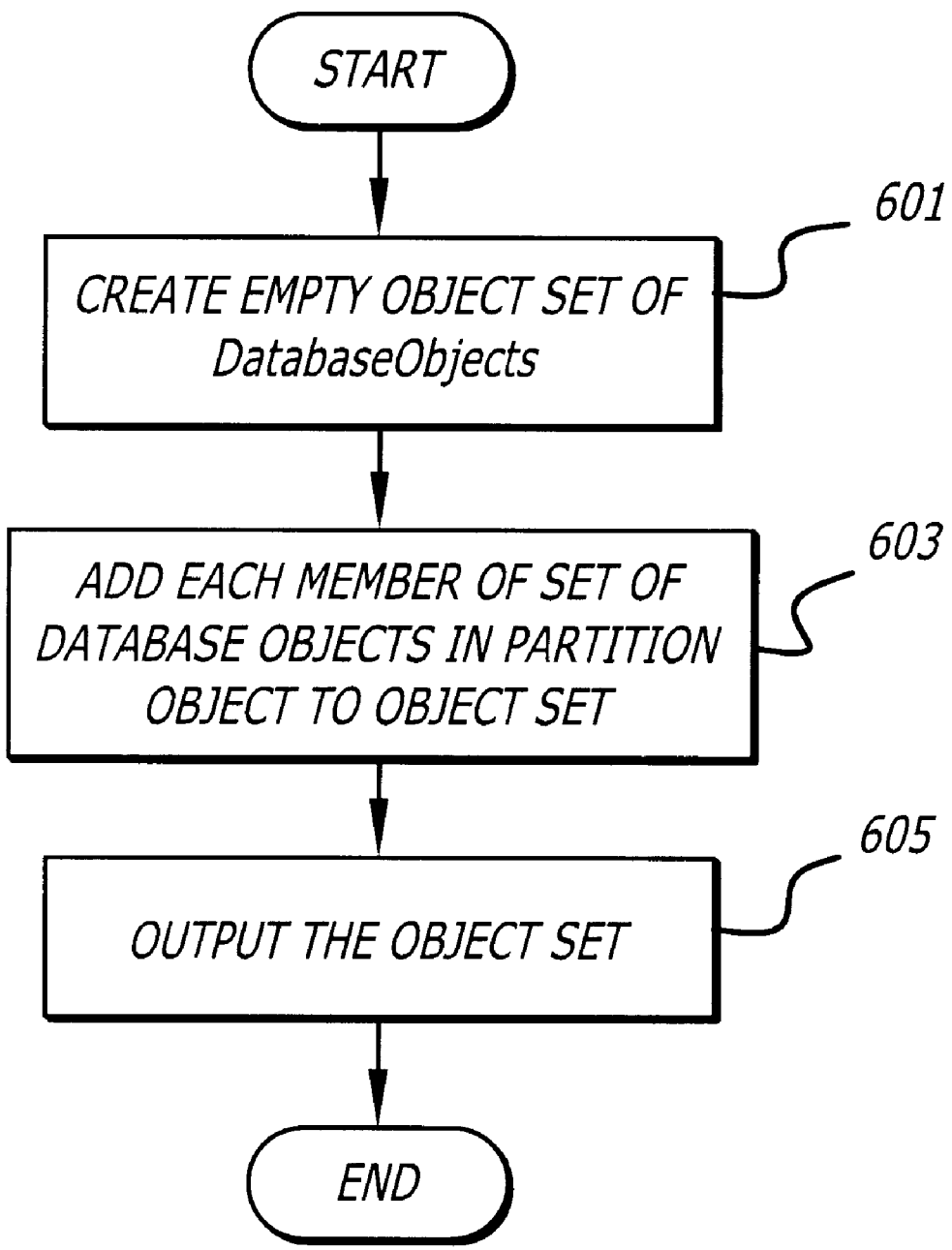
FIG. 6 shows a flowchart of an example method for determining a set of database objects in view compatible with the present invention.

The set of all DatabaseObjects in view is determined by the example method shown in FIG. 6. This method uses the PartitionsInView object created in "Method of Determining a View".

At step 601, a new, empty Set of DatabaseObjects called the Object Set is created. For each Partition object in the Dictionary of partitions in the PartitionsInView object, at step 603 add each member of the Set of database_objects 303 in the Partition object, to the Object Set. At step 605, output the Object Set.

This method results in the Set of all DatabaseObjects in a view. The set can be used to handle external database queries, e.g., an application can search for DatabaseObjects meeting certain criteria by searching only within the ObjectSet.

Figure 7:
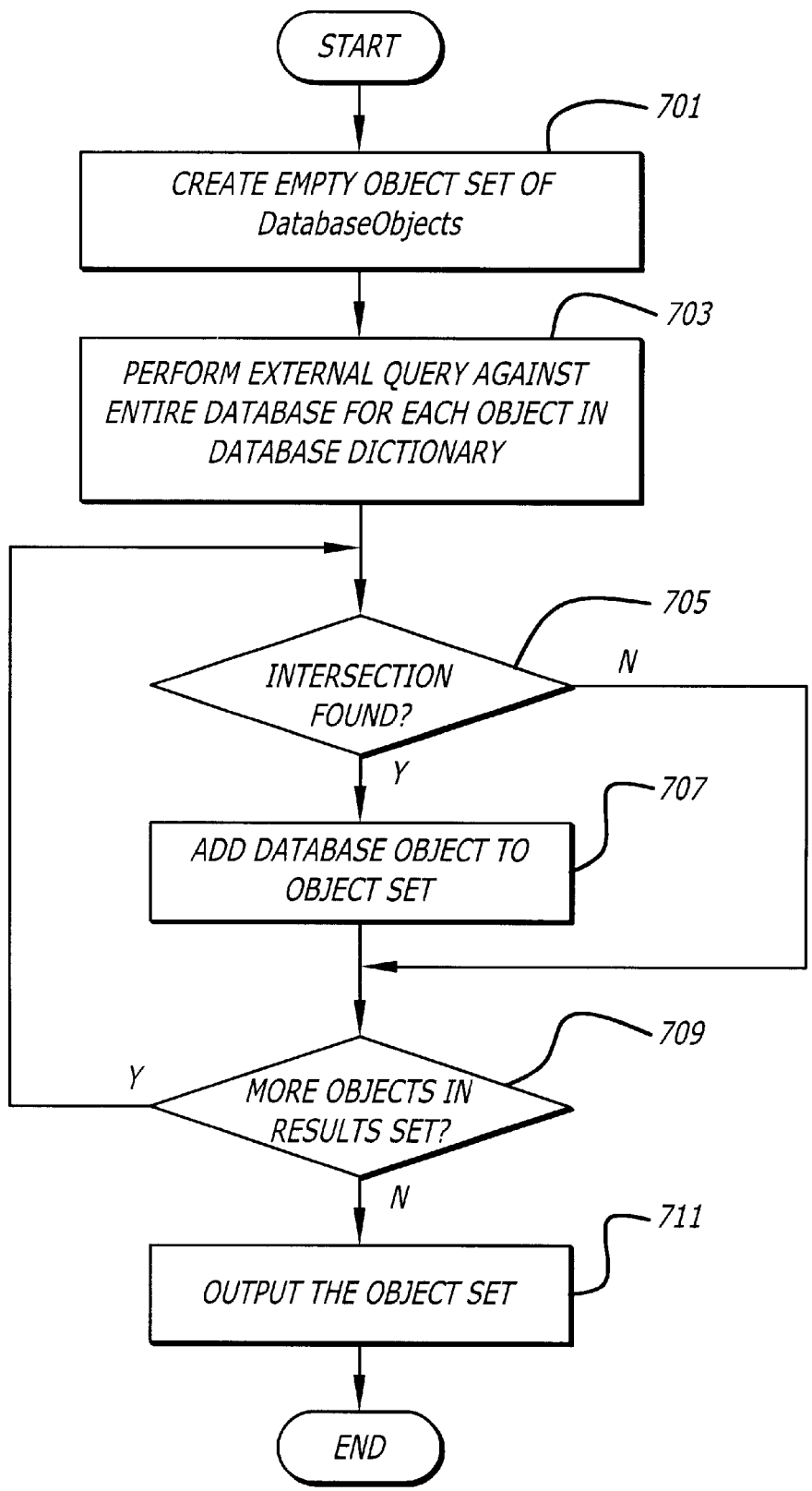
FIG. 7 shows a flowchart of an example method for handling external database queries compatible with the present invention.

An alternative method for handling external database queries based on filtering is shown in FIG. 7.

At step 701, a new, empty Set of DatabaseObjects called the Object Set is created. For each Database object in the Dictionary of databases in the PartitionsInView object, at step 703 perform the external query against the entire database. This results in a new set of DatabaseObjects called the Query Results Set. At step 705, for each DatabaseObject in the QueryResultsSet determine if any of the Partitions in the DatabaseObject's partitions set is also contained in the PartitionsInView object's Dictionary of partitions. In other words, determine if there is an intersection between the set of Partitions in the DatabaseObject, and the Dictionary of Partitions in view. If so, the DatabaseObject is in the view and at step 707 the database object is added to the Object Set. If at step 709 there are more objects in a results set, control returns to step 705. Otherwise, at step 711, the Object Set is output.

Figure 8A:
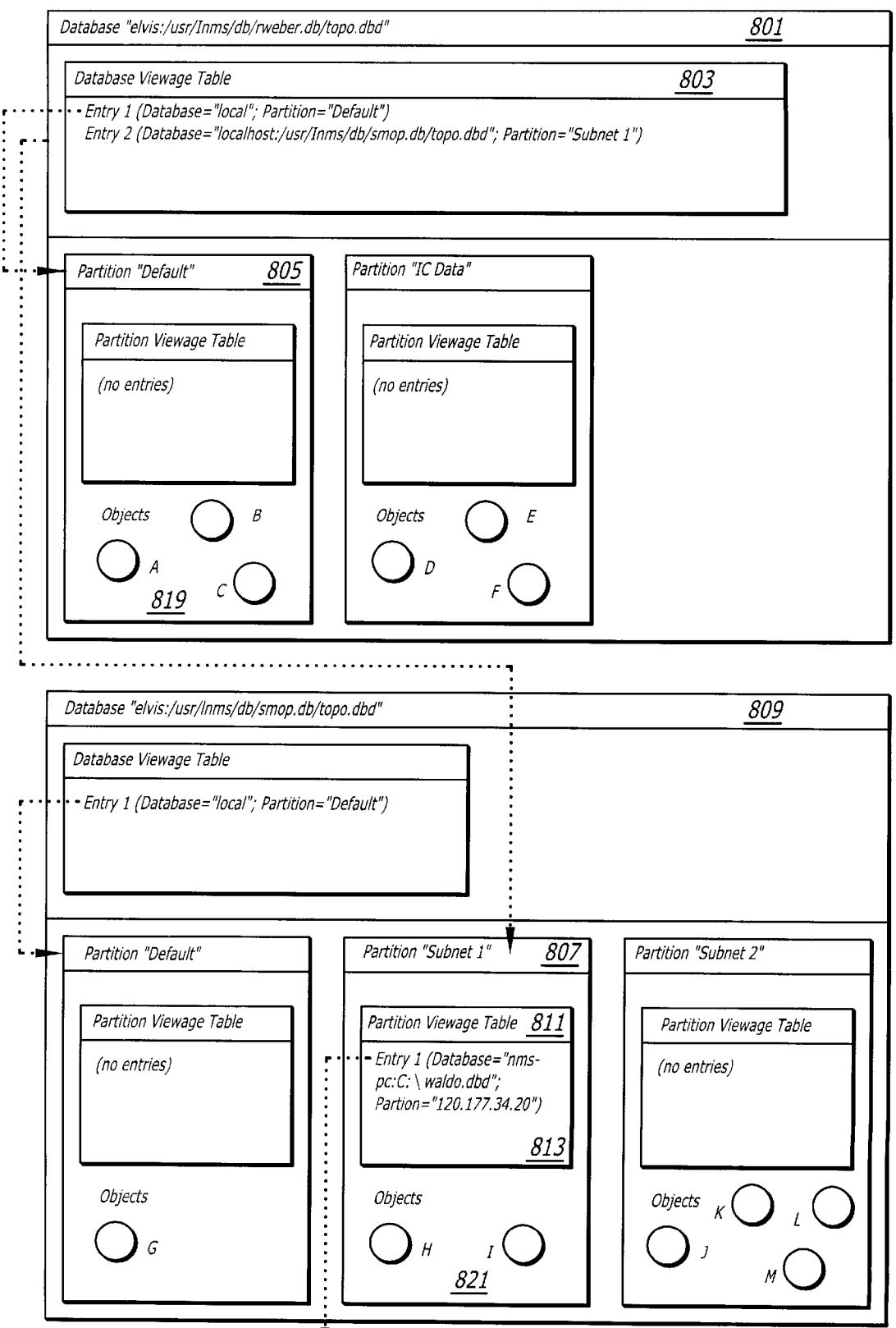
FIGS. 8A–8B show an example database entry compatible with the present invention.
Figure 8B:
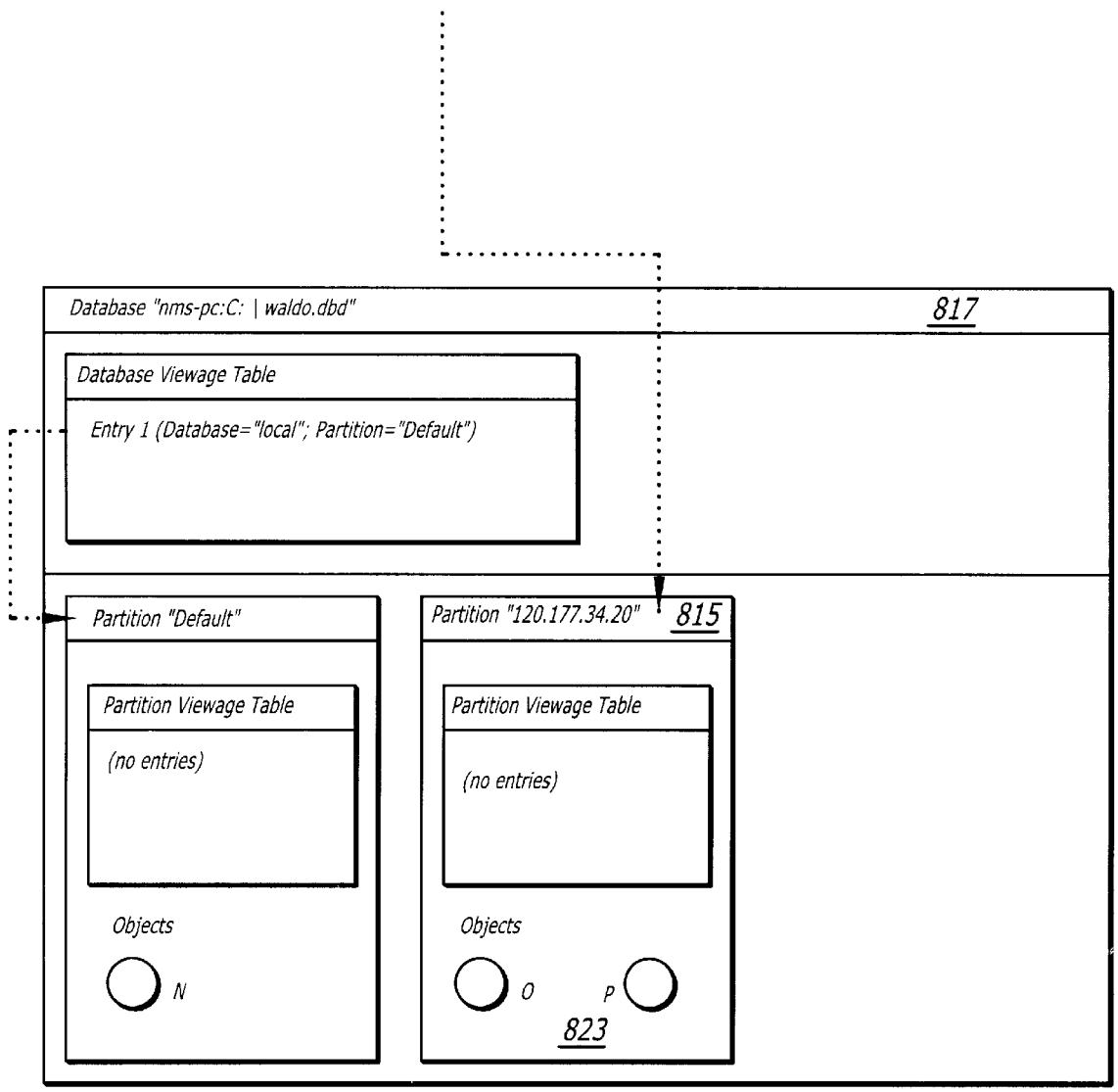

FIGS. 8A–8B show an example of how viewage works with an embodiment of the disclosed technology. The example shown in FIGS. 8A–8B illustrates three databases, and how the viewage table entries set up a view of data that spans all three databases. The example shows how a view contains a subset of all available data, as just a subset of all partitions are in this view. The example also illustrates which data is in view and which is not.

Thick dotted lines are used to represent the targets of ViewageTable entries. The example shows a per-user database which establishes the per-user view; a topology database which contains subnet-level information; and an endnode database which contains endnode devices, partitioned by concentrator. In the example there are a total of seven partitions in three databases, and a total of 16 database objects labeled A through P.

In the example, the originating database ID 801 is shown by the identifier "elvis:/usr/lnms/db/rweber.db/topo.dbd". This is the per-user database for the user "rweber". The host name of the machine holding the database is "elvis" and the pathname of the database is "/usr/lnms/db/rweber.db/topo.dbd".

The originating database has a Database Viewage Table 803 with two entries: one entry for the partition ID "Default" 805 in the same database, and one entry for the partition ID "Subnet 1" 807 in the database 809 "elvis:/usr/lnms/db/smop.db/topo.dbd". The latter is the topology database, partitioned by subnet.

Thus far, two partitions are in view, "Default" 805 from the user database and "Subnet 1" 807 from the topology database. Database objects A–C 819 and H–I 821 are also in view. In addition, two databases are in the list of databases in the PartitionsInView object which is being created.

However, the "Subnet 1" 807 partition in the topology database 809 also has a partition Viewage Table 811. The "Subnet 1" 807 partition Viewage Table 811 has an entry 813 referring to partition ID "120.177.34.20" 815 in database ID 817 "nms-pc:C:\waldo.dbd". Database 817, the endnode database, resides on host "nms-pc" and is located at path "C:\waldo.dbd".

Following this view, partition "120.177.34.20" 815 is added to the view, and the database 817 "nms-pc:C:\waldo.dbd" is added to the list of databases. The database objects O and P 823 are also in the view.

The final contents of the PartitionsInView object are given below:

Partitions in view:
 "Default" (from elvis: /usr/lnms/db /rweber.db/topo.dbd)
 "Subnet 1" (from elvis:/usr/lnms/db/smop.db/topo.dbd)
 "120.177.34.20" (from nms-pc:C:\waldo.dbd)

Databases in view:
 elvis:/usr/lnms/db/rweber.db/topo.dbd
 elvis:/usr/lnms/db/smop.db/topo.dbd
 nms-pc:C:\waldo.dbd Database objects in view:
 A, B, C, H, I, O, P Thus, the database objects NOT in the view are D, E, F, G, J, K, L, M, and N. The partitions NOT in the view are "IC Data" from elvis:/usr/lnms/db/rweber.db/topo.dbd; "Default" and "Subnet 2" from elvis:/usr/lnms/db/smop.db/topo.dbd; and "Default" from nms-pc:C:\waldo.dbd.

In the example, every database has a Database Viewage Table. However, this table is ignored in all but the originating database. It only acts as a view origination point. Partition ID's only need be unique within a database; they can be duplicated across databases. Partition ID's must be unique within a view. If a duplicate Partition ID is encountered, that partition is ignored.

Figure 9A:
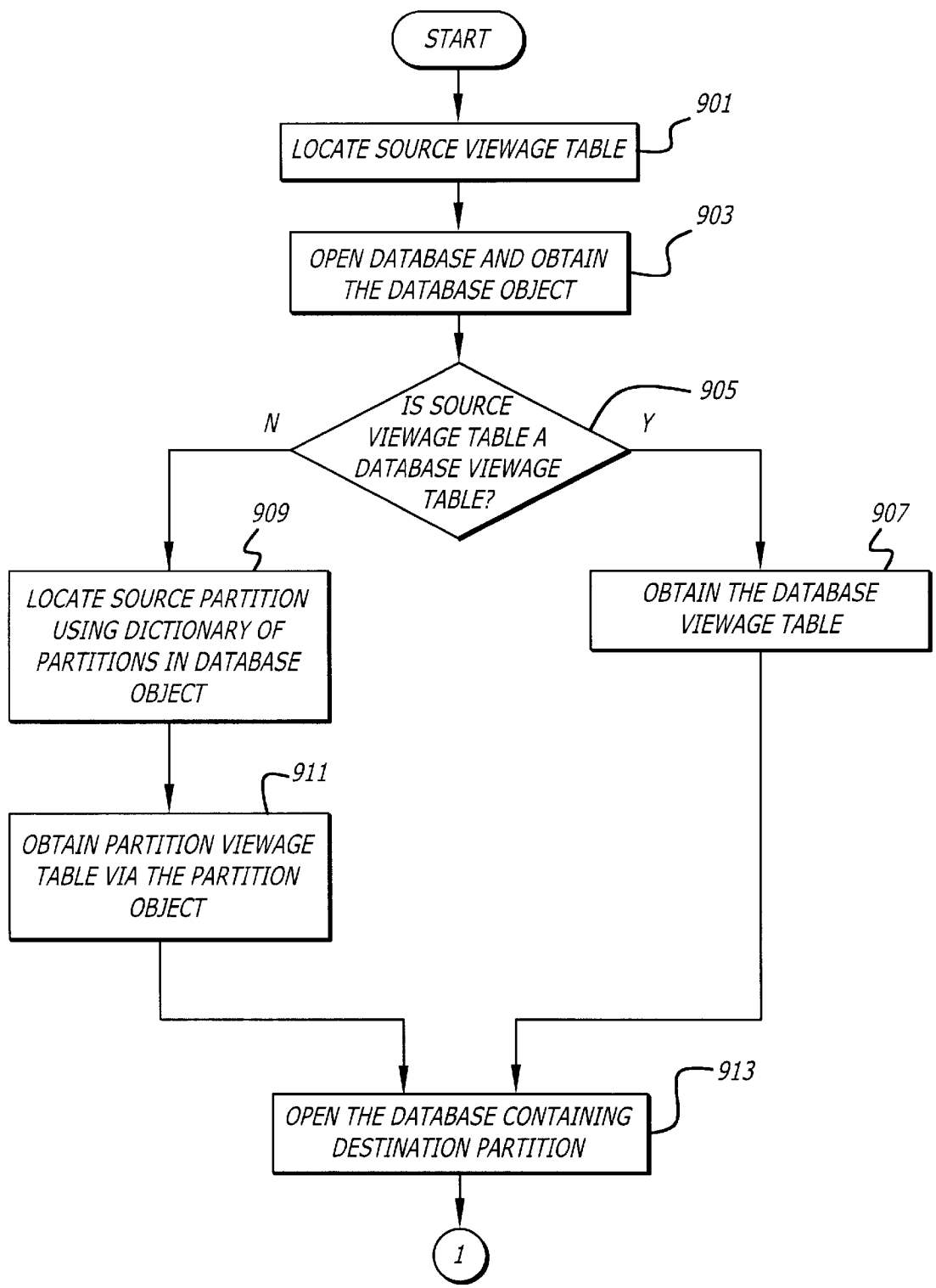
FIGS. 9A–9B show a flowchart of an example method for establishing a view compatible with the present invention.
Figure 9B:
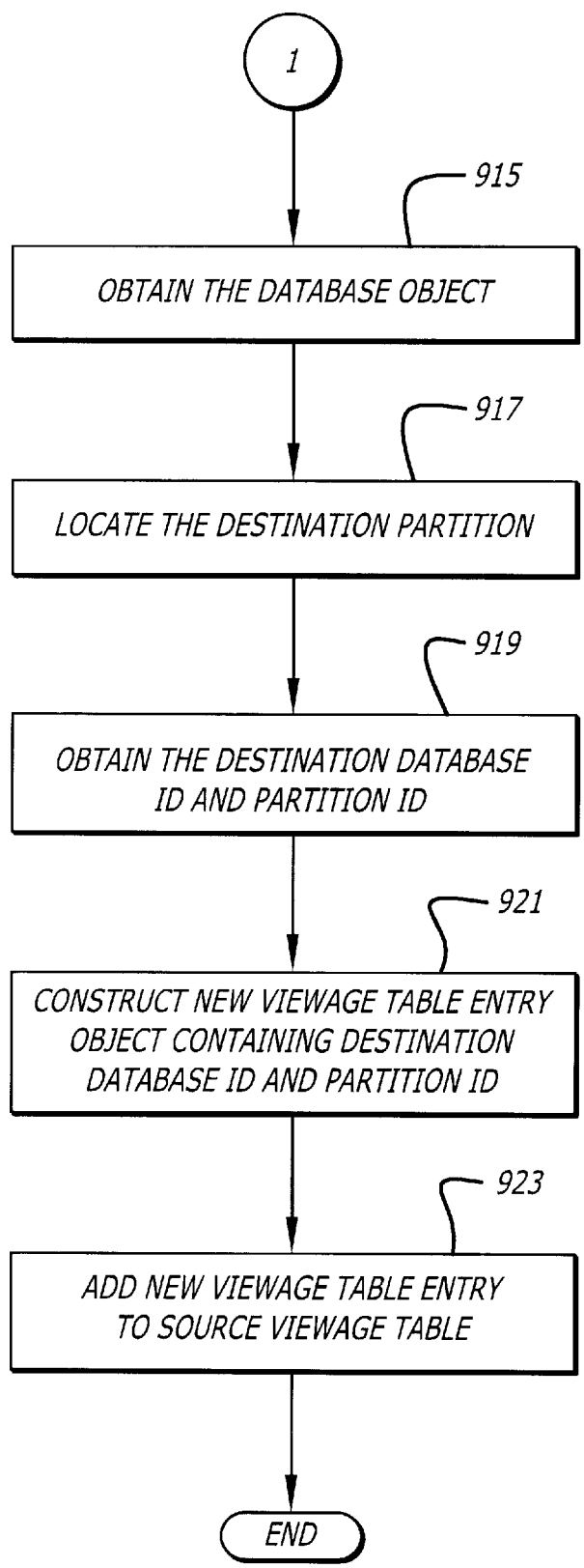

An example method for establishing a view is given in FIGS. 9A–9B. At step 901, a Source Viewage Table is located. The disclosed method creates a view from a given source Viewage Table to a given destination partition. The source Viewage Table can be either a Database Viewage Table or a Partition Viewage Table. At step 903 the desired source database is opened and the Database object is obtained. If at step 905 the source viewage table is a Database Viewage Table, at step 907 the Database Viewage Table is obtained via the Database object. This is designated as the Source Viewage Table. Otherwise, at step 909 the source partition is located using the Dictionary of partitions in the Database object, and at step 911 the Partition Viewage Table is obtained via the Partition object, which is designated as the Source Viewage Table.

At step 913, the database containing the destination partition is opened and at step 915 the Database object is obtained. At step 917, the destination partition is located. This can be done using the Dictionary of partitions in the Database object. At step 919, the destination database ID and destination partition ID are obtained.

At step 921, a new ViewageTableEntry object is constructed containing the destination database ID and the destination partition ID. At step 923, the new ViewageTableEntry is added to the Source Viewage Table.

In one embodiment of the disclosed technology, a single homogeneous data model is created that spans multiple independent databases. This represents the union of data from all databases which is presented as if it was all coming from a single database.

Each database holds a group of DatabaseObjects, partitioned in a set of Partitions. Furthermore, each DatabaseObject can be related to zero or more other DatabaseObjects, via the related_database_objects field in the DatabaseObject class 301. This is illustrated in FIG. 10 with two databases. For the purpose of clarity, some components have been removed from the figure.

If there are multiple databases which are all independent, it is possible that there may be copies of a given DatabaseObject in more than one database. This is referred to as having duplicate objects, which means each object has the same ID which is unique only within a database. As shown in FIG. 10, a database 1001 contains partition X 1003 which has objects A 1005, B 1007, and C 1009, and partition Y 1011 which has objects D 1013, E 1015, and F 1017. A database 1019 contains partition A 1021 which has object A 1023, and partition B 1025 which has objects E 1027, and F 1029. Objects A 1005, 1023, E 1015, 1027 and F 1017, 1029 are duplicate objects because they each exist in more than one database.

A problem may arise when each database is populated by an independent topology discovery application. It is possible that the same topology device such as a router may be discovered by more than one topology discovery application, and be modeled as a DatabaseObject in more than one database. In addition, although each duplicate copy of the object has the same ID, it is possible that any state associated with the object may be different in each object.

Because data is gathered from multiple databases and presented as a view, duplicate objects cannot be in the same view. In addition, the view must be consistent, such that every time a given view is accessed, the same data is presented. For example, if a different duplicate object instance were to be presented each time a view was accessed, this would lead to an inconsistent view because the state of each object may differ. The disclosed technology uses an approach that orders the searching of databases, and always presents the first duplicate object found to the view, and ignores duplicate objects after the first object.

Object relatives or other DatabaseObjects 309 may or may not be in a given view. Those objects which are not in a view must be filtered out of the view. Further, duplicate objects may each hold a different set, subset or superset of object relatives. As shown in FIG. 10, object A 1005, 1023 has a different set of relatives in each database. The disclosed technology finds the unique union of relatives in view of duplicate objects.

For example, referring to FIG. 10, assume that Partitions X 1003, A 1021, and B 1025 are in a given view, but that Partition Y 1011 is not. Taking duplicate object resolution, viewage, and relationships into account, the view presented is that given in FIG. 11. It will be noted that a composite 1101 is formed of the data from databases 1001, 1019: Object A 1103 is taken from Partition X 1003 in database 1001 because the first found copy is taken. This assumes that the topmost presented database was searched first. Relationships to Objects B 1105 and C 1107 are taken from database 1001, but the relationship to Object D 1013 is discarded since Partition Y 1011 is not in view. The relationship between Object A 1103 and Object E 1109 comes from database 1019. Objects E 1019 and F 1111 also come from database 1019, as their duplicate counterparts in database 1001 are not in view.

Figure 12:
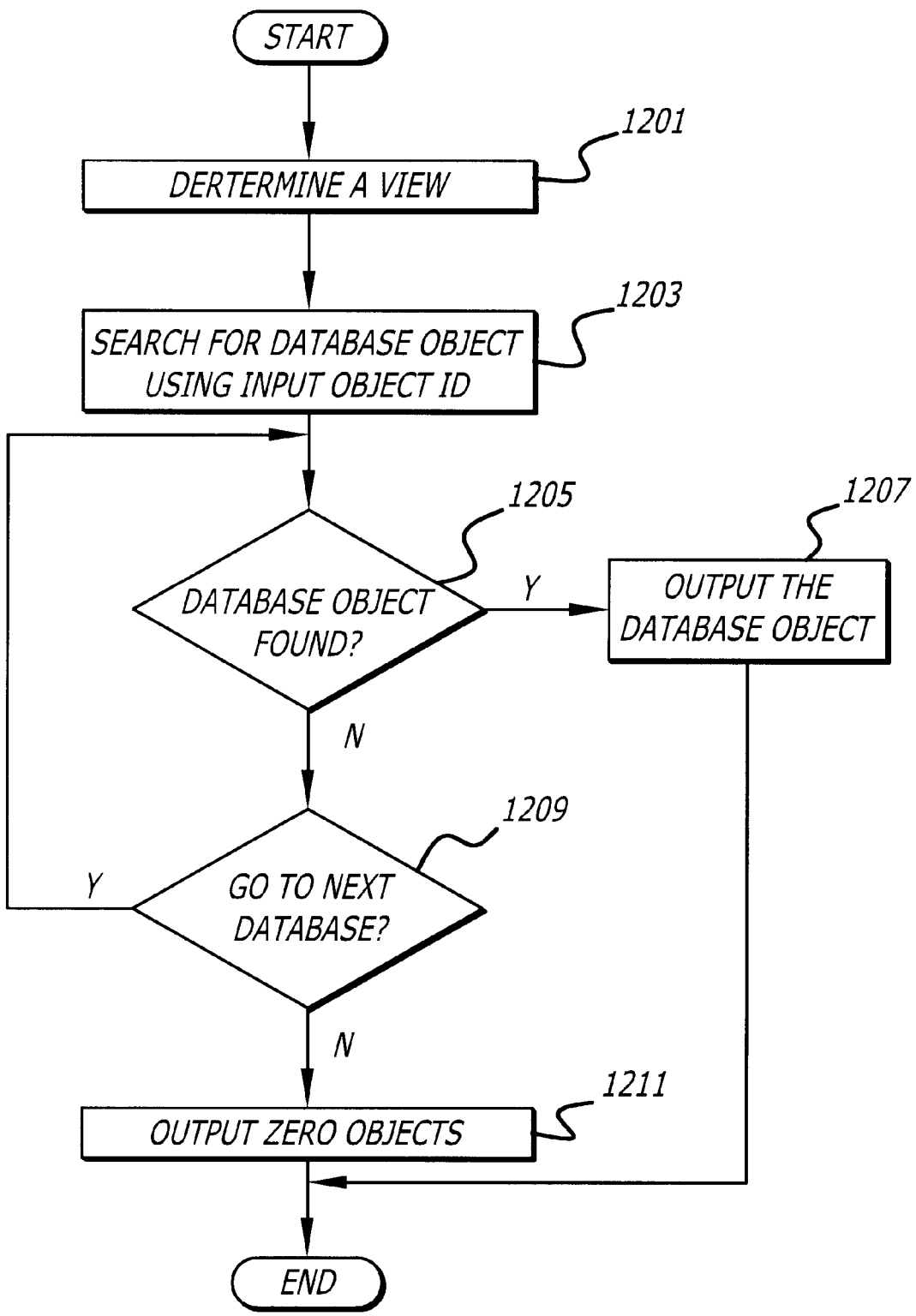
FIG. 12 shows a flowchart for finding a target object instance given an input Object ID compatible with the present invention.

An example method for finding a target object instance given an input Object ID is given in FIG. 12. The method outputs zero or one DatabaseObjects. At step 1201, a view is determined as described above and as shown in FIGS. 5A–5B. Step 1201 outputs a PartitionsInView object with a set of databases and a set of partitions. The set of databases is typically implemented with an array and has a determinate order. For the purpose of this description, it is assumed that each database in the set of databases exists and is open.

For each database in the set of databases in the PartitionsInView object, at step 1203 the database is searched for the input Object ID. The search method typically involves a binary tree style of lookup, but it will be recognized by one of ordinary skill in the art that other search methods may be used without loss of generality. Step 1203 returns exactly one DatabaseObject with a matching ID if such an object exists in the database, zero DatabaseObjects otherwise. It will be noted that the ID uniquely identifies a DatabaseObject within the scope of a single database. If at step 1205 a DatabaseObject was found, at step 1207 the DatabaseObject is output. Otherwise, if at step 1209 there are additional databases, control returns to step 1205. Otherwise, if at step 1209 no matching DatabaseObject is found in any database, at step 1211 zero DatabaseObjects are output.

Figure 13:
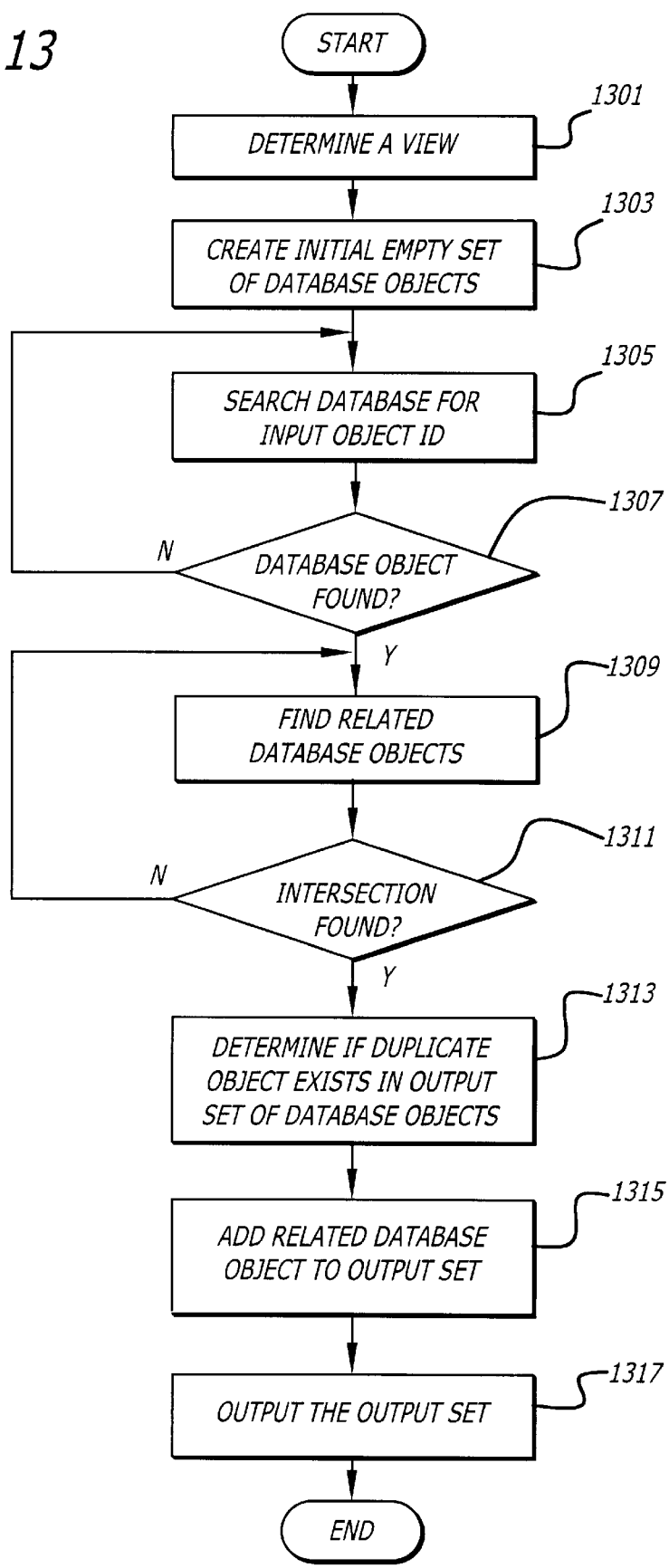
FIG. 13 shows a flowchart for returning a set of DatabaseObjects related to the DatabaseObject specified by the input object ID compatible with the present invention.

An example method for returning a set of DatabaseObjects related to the DatabaseObject specified by the input object ID is given in FIG. 13.

At step 1301, a view is determined as described above and as shown in FIGS. 5A–5B. Step 1301 outputs a PartitionsInView object with a set of databases and a set of partitions. The set of databases is typically implemented with an array and has a determinate order. For the purpose of this description, it is assumed that each database in the set of databases exists and is open. At step 1303, a set of DatabaseObjects to output is created which is initially empty.

For each database in the set of databases in the PartitionsInView object, at step 1305 the database is searched for the input Object ID. The search method typically involves a binary tree style of lookup, but it will be recognized by one of ordinary skill in the art that other search methods may be used without loss of generality. Step 1305 returns exactly one DatabaseObject with a matching ID if such an object exists in the database; zero DatabaseObjects otherwise. It will be noted that the ID uniquely identifies a DatabaseObject within the scope of a single database.

If at step 1307 a DatabaseObject was not found, control returns to step 1305. Otherwise, at step 1309 all DatabaseObjects are found which are related to the DatabaseObject via the related_database_objects set in the DatabaseObject class 301.

For each related DatabaseObject, at step 1311, determine if any of the Partitions in the related DatabaseObject's partitions set is also contained in the PartitionsInView object's Dictionary of partitions. In other words, determine if there is an intersection between the set of Partitions in the DatabaseObject, and the set (Dictionary) of Partitions in the view.

If at step 1311 an intersection was not found, control returns to step 1309. Otherwise, the related DatabaseObject is in the view, and at step 1313 it is determined if a duplicate object is already in the output set of DatabaseObjects, based on object ID. One implementation performs a linear search of the output set, but it will be recognized by one of ordinary skill in the art that other search methods may be used without loss of generality. Step 1313 insures that the output set contains a unique set of related objects.

If the output set of DatabaseObjects does not contain an object with the same object ID, at step 1315 the related DatabaseObject is added to the output set of DatabaseObjects. At step 1317, the output set of DatabaseObjects is output.

The disclosed technology addresses how the use of a generic publisher/subscriber type of notification system can be applied to one or more Databases, such that notifications are filtered to the scope of a given View.

Figures 14, 17:
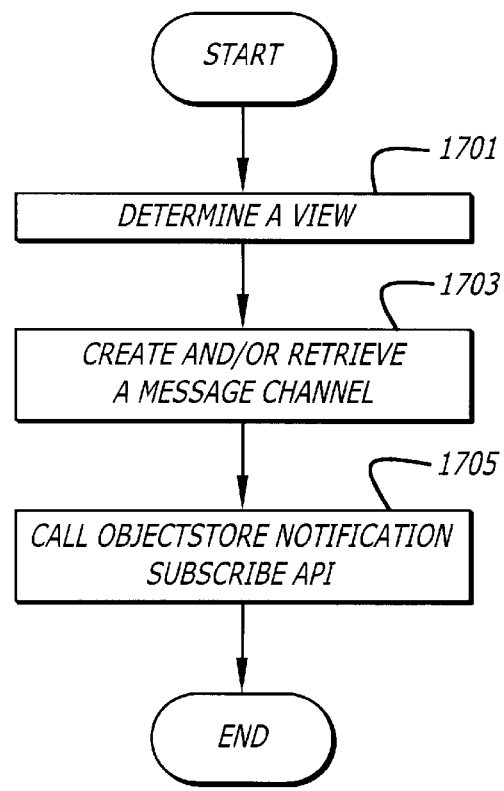
FIG. 14 shows database notification data structures compatible with the present invention.
FIG. 17 shows a flowchart for subscribing to a notification type compatible with the present invention.

FIG. 14 shows an example of database viewage data structures compatible with the disclosed technology. The example classes and fields shown in FIG. 14 may be defined as given below.

Database class: A database class 1401 is similar to the database class 301 described above and shown in FIG. 3. The field of interest for notifications is notification_addresses, shown in FIG. 14. The field for notifications 1401 may be defined as given below.

Dictionary<int> notification_addresses: A Dictionary holding a set of integers, each integer corresponding to a specific Notification type. The address of each integer defines a unique message channel.

Notification class: A notification class 1403 is presented externally and is used as the basis for applications to send and receive notifications. It acts as a presentation interface for the internal os_notification class. The fields of the notification class 1403 may be defined as given below.

int type: This is an application-defined message type. Each type corresponds to some event or action of interest to the application. Examples of message types are shown in Table 1 below.

void*address: The database address of the message channel against which this notification is being sent.

const char*data: Contains application-specific data concerning the details of the event or action in question. The format of the data is application-specific and is a function of the message type. The contents and format of this field do not matter as long as the contents are represented as an ASCII string. Examples of data for each message type are shown in Table 1.

Set partitions_in_view: The set of Partition ID's associated with this Notification. For example, if the subject of a Notification is a DatabaseObject, then this field holds a list of all Partition IDs associated with the DatabaseObject. In general, if the Notification has any direct or indirect association with one or more Partitions, then this field holds that set of Partition ID's. If the Notification is not associated with any Partition, then this set is empty. In the latter case, the meaning of the Notification is construed as "in view" of the entire originating database.

TABLE 1

Example Message Types

| Value | Meaning | Application-Specific Data* |
| --- | --- | --- |
| 1 | DatabaseObject created | Type of created object, Object ID |
| 2 | DatabaseObject deleted | Type of deleted object, Object ID |
| 3 | DatabaseObject property changed | Name of changed property, New Value of property, Object ID |
| 4 | DatabaseObject relationships changed | ID of related object, Operation type (add/remove), Object ID |
| 5 | DatabaseObject type changed | old Type, new Type, Object ID |
| 6 | DatabaseObject ID changed | new Object ID, old Object ID |
| 101 | Partition created | Partition ID |
| 102 | Partition deleted | Partition ID |
| 103 | Viewage added | Source Partition ID, Destination Partition ID |
| 104 | Viewage removed | Source Partition ID, Destination Partition ID |
| 105 | Database created | Database ID |
| 106 | Database deleted | Database ID |
| 900–1002 | Reserved for property-specific notifications | ID of object, Name of changed property, New Value of property |

*The content, format, and semantics of the application-specific data is only shown here for illustrative purposes. Other content and formats may be used with the disclosed technology without loss of generality.

Figure 15:
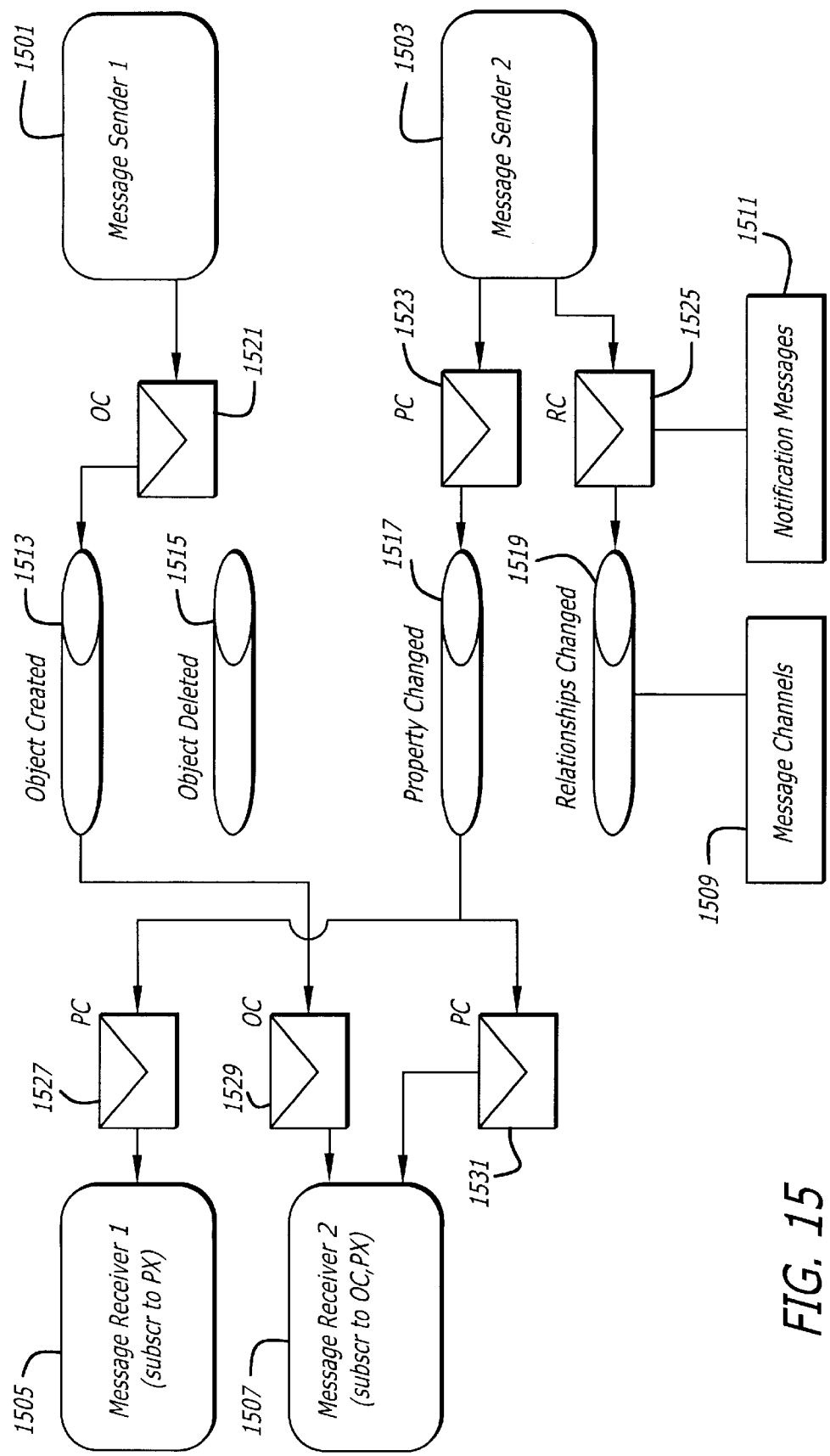
FIG. 15 shows message channels and message delivery compatible with the present invention.

One embodiment of the disclosed technology is shown by FIG. 15. The system includes a generic notification system that allows the creation of logical "message channels" 1509 such that a message recipient 1505, 1507 can subscribe to zero or more message channels 1509. Message senders 1501, 1503 can create notification messages 1511 and send them to a particular message channel 1509 and the notification system will deliver the message to all subscribed recipients 1505, 1507. In one embodiment, the notification system is produced by Object Design Inc. of Boston, MA, and is included as part of their ObjectStore product.

The system includes one or more Databases, each with a set of application-specific message channels. Each message channel corresponds to a Notification type. Examples of Notification types are shown in Table 1 above.

Notifications 1511 are sent between senders 1501, 1503 and receivers 1505, 1507. Each Notification is associated with a channel 1509. Thus, a Notification 1511 is always scoped to a specific Database. Some Notifications 1511 also contain DatabaseObject-specific data, and are thus scoped to a specific DatabaseObject in a specific Database.

The embodiment of the disclosed technology includes a message filtering system that filters Notifications to the scope of a View.

The ObjectStore notification system comprises a notification class, os_notification, and a method for sending and receiving notifications.

Applications may send notifications by associating an os_notification object with a database address, optionally assigning a single application-specific string to the notification, and calling a send method.

Applications may receive notifications by subscribing to one or more database addresses, then either calling a blocking receive function or by listening to a socket, such as with a select call. The socket is supplied by ObjectStore.

The os_notification class contains two pieces of data: A database address, and an ASCII string. The database address is required, and the string is optional. The string, if set by a message sender, will be transmitted to and received by the receiver. Typically, the string would contain information that has meaning to both the sending and receiving applications.

The disclosed technology uses the ObjectStore notification system by setting up a series of message channels, each corresponding to a unique Notification type. All os_notifications of a given type are associated with the address of the corresponding channel (e.g., the address of a corresponding entry in the Database notification_addresses dictionary) and sent using the ObjectStore send method.

On the receiving end, applications register interest (subscribe) to Notification types of interest by calling the ObjectStore subscribe method against the address of the corresponding channel, as above.

The system also runs on top of the ObjectStore delivery mechanism, such that the ObjectStore mechanism is used to receive os_notification objects.

Since applications work with Notification objects and not the low-level os_notification objects, the conversion is performed internally. On the send side, an os_notification object is constructed from the information in a given Notification object and send the os_notification object. On the receive side, an os_notification object is received from the ObjectStore delivery mechanism, construct a Notification object from the data present in the os_notification, and present the Notification object to the application.

The basic principles of message channels and message delivery with the use of message channels are shown in FIG. 15 within the scope of a single database. It will be noted that the database itself, Viewage, and the message filtering system have been omitted for clarity.

As shown in FIG. 15, there are two message senders 1501, 1503, two message receivers 1505, 1507, and a set of four communications channels 1509 corresponding to the actions Object Created 1513 (also referred to in the illustration as OC), Object Deleted (OD) 1515, Property Changed (PC) 1517 and Relationships Changed (RC) 1519.

The first message sender process 1501 is sending an Object Create 1521 notification assuming it has created a new object in a database. The notification is placed in the Object Created 1513 message channel. Likewise, the second message sender 1503 creates and sends a Property Changed 1523 notification and a Relationships Changed 1525 notification.

The message receivers 1505, 1507 have already set up subscriptions for notifications: The first message receiver 1505 has subscribed to Property Changed 1527 notifications, and the second receiver to Object Created 1529 and Property Changed 1531 notifications. Thus, the notification system delivers the Object Created 1521 notification to the second message receiver 1507, and the Property Changed 1523 notification to both message receivers 1505, 1507.

Since there are no subscribers for the Relationships Changed 1525 notification, the notification is not delivered to any recipient.

The system described thus far allows for sending and receiving of messages in scope of a database since message channels are defined as addresses within a database. The disclosed technology also covers a two-step process of notification filtering. The first step registers for notifications against only those Databases in the view, possibly multiple databases. This guarantees that no notifications are received from databases outside the view, but notifications still will be received from all partitions in each database and thus from partitions which may not be in the view.

The second step is a filter placed on the receiving end, which ensures that the Notification is associated with one or more Partitions in the View. This is performed by determining if the set of Partitions in the Notification is a subset of Partitions in the View.

Figure 16:
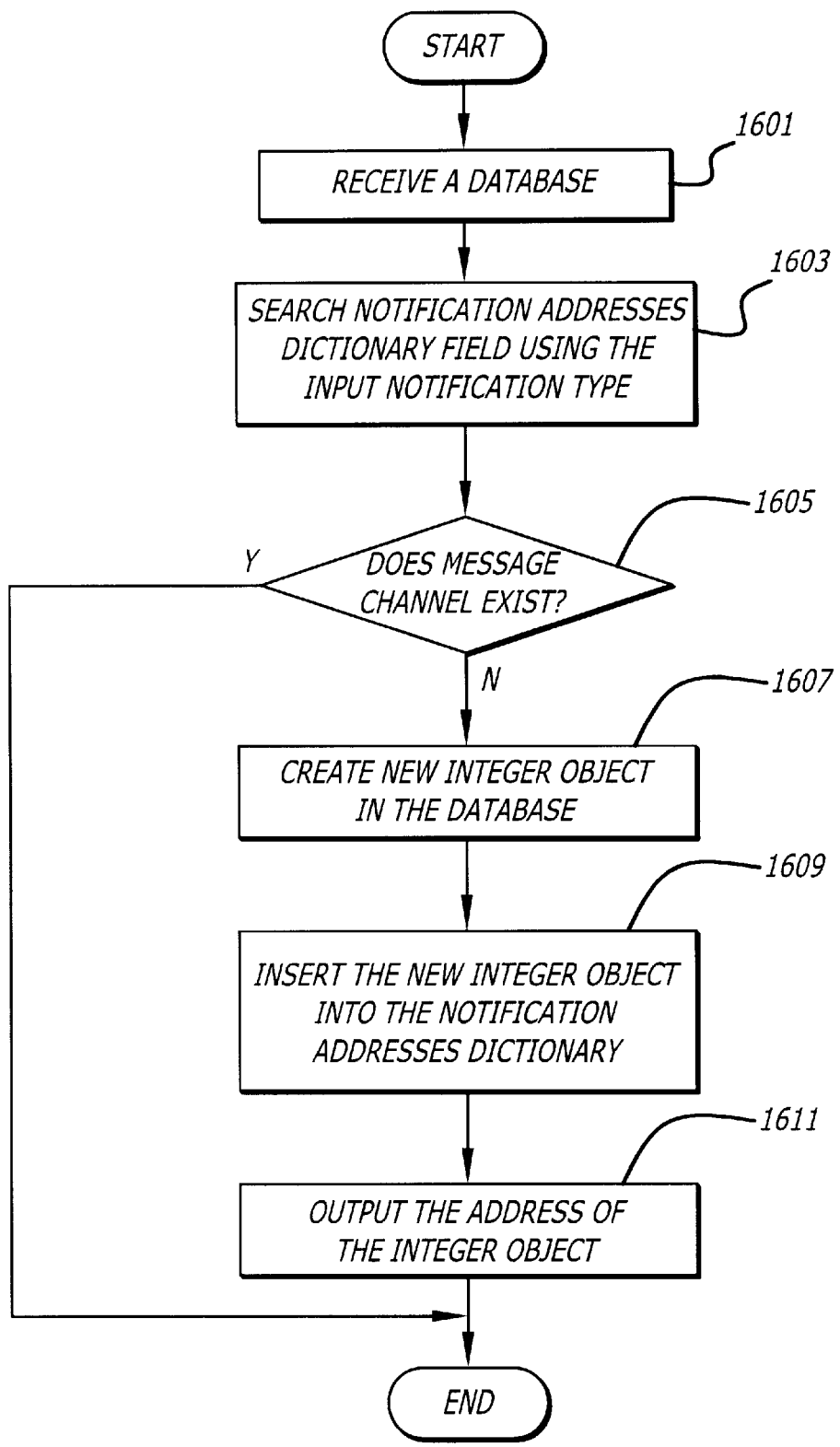
FIG. 16 shows a flowchart for creating a new message channel address compatible with the present invention.

Message channels are preferably created dynamically, as applications either register for Notification types of interest against a particular database, or create Notifications to send against specific DatabaseObjects or databases. In both cases, the message channel Notification type is checked to determine if it exists in the Dictionary of notification_addresses in the Database object. If it does not exist, a new address is created and added to the Dictionary as given below and as shown in FIG. 16.

At step 1601, a Database is received in which to create a message channel, and a Notification type of the message channel. At step 1603, the notification_addresses Dictionary field in the Database is searched using the input Notification type as the key. The search returns a pointer to an integer object in the database if found. If at step 1605 the pointer to integer object is found, the message channel exists. Otherwise, at step 1607 a new integer object is created in the database. One implementation also sets the value to that of the Notification type. At step 1609, the new integer object is inserted into the notification_addresses Dictionary, using the Notification type integer value as the key value. At step 1611, the address of the integer object is output.

In one embodiment, no message channels are pre-created, and are created only when requested. It is assumed that there is no ordering of message channel integer types or of their minimum or maximum values. In addition, gaps are allowed in the set of integer types. The use of a Dictionary data type makes this policy possible. It will be recognized by one of ordinary skill in the art that other policies may be used with the disclosed technology without loss of generality.

FIG. 17 shows a method used to subscribe to a given Notification type. The Notification type is typically an integer and is the input for this method. At step 1701, a view is determined as described above and as shown in FIGS. 5A–5B. This step outputs a PartitionsInView object with a set of databases and a set of partitions . The se t of databases is implemented with an array and has a determinate order. Assume that each database in the set of databases exists and is open. At step 1703, a message channel is created and/or retrieved using the input Notification type, as outlined above and as shown in FIG. 16. Step 1703 returns an address. At step 1705 the ObjectStore notification subscribe API is called using the database address from step 1703 as input.

Figure 18:
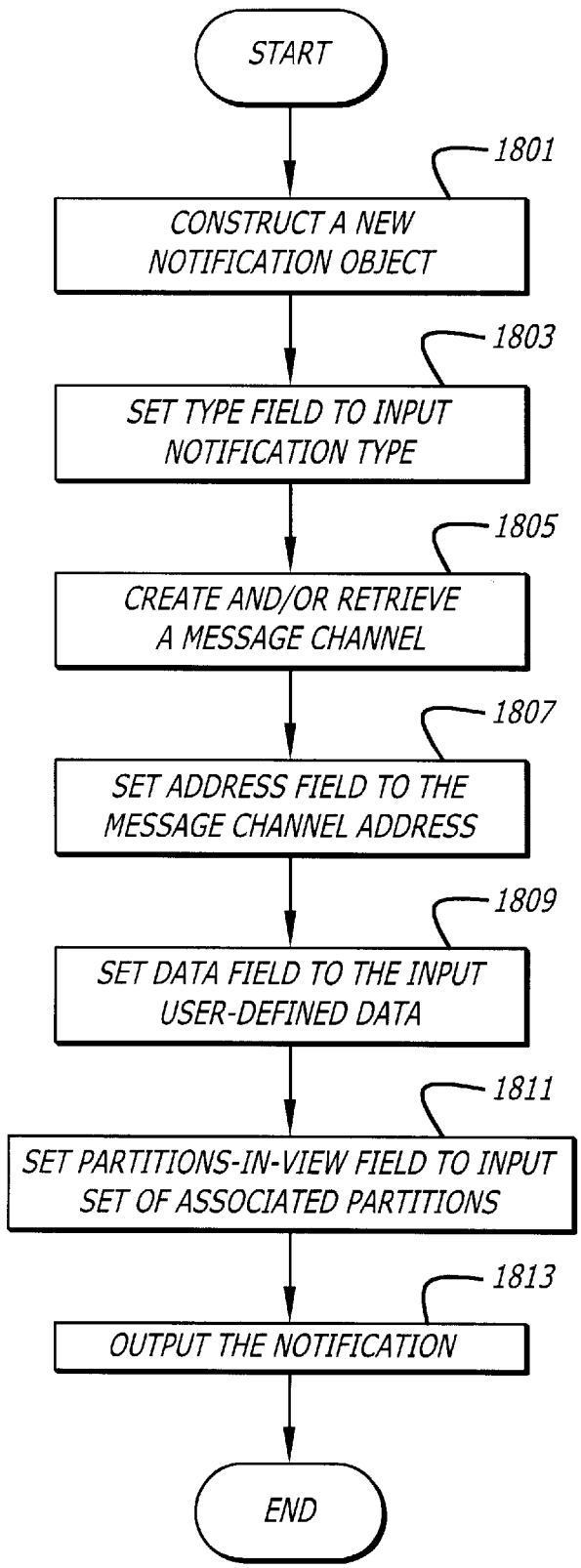
FIG. 18 shows a flowchart for creating a notification object compatible with the present invention.

FIG. 18 shows a method for creating a Notification object, in preparation for sending it. The input is typically a Database in which scope the Notification should be sent, the Notification type desired for the notification, an ASCII string of user-defined data, and a Set of Partition ID's to be associated with the Notification. At step 1801, construct a new Notification object. At step 1803, set the type field of the Notification to the input Notification type. At step 1805, create/retrieve a message channel in the input database using the input Notification type, as outlined above and as shown in FIG. 16. Step 1805 returns a message channel address. At step 1807, set the address field of the Notification to the message channel address. At step 1809, set the data field of the Notification to the input user-defined data. At step 1811, set the partitions_in_view field of the Notification to the input Set of associated Partitions. At step 1813, output the Notification.

It will be noted that if the Notification is DatabaseObject-specific (for example, Notification types 1 through 6), then the input set of associated Partitions is typically equal to the partitions field in the DatabaseObject class.

Figure 19:
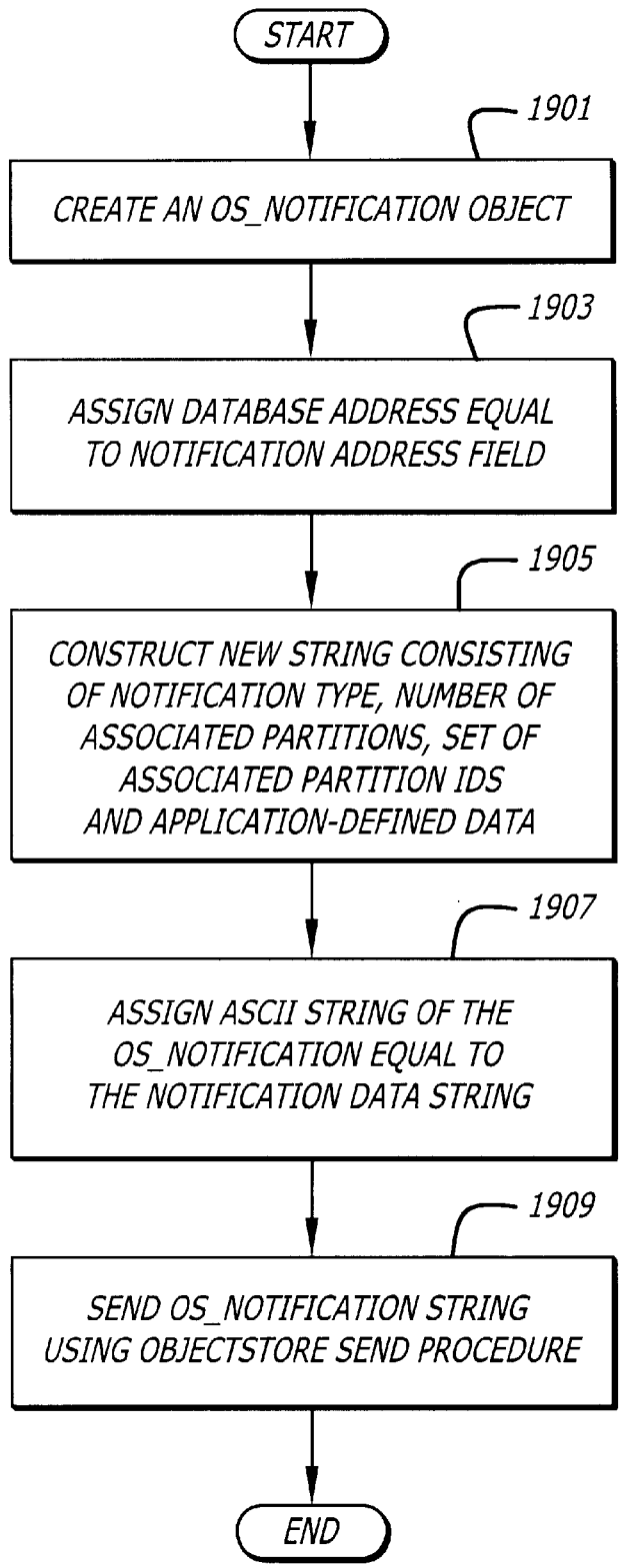
FIG. 19 shows a flowchart for sending an ObjectStore notification compatible with the present invention.

FIG. 19 shows a method for sending an ObjectStore notification. The input to this method is a Notification object described above. At step 1901, create an os_notification object, which is the ObjectStore native notification object. At step 1903, assign the database address of the os_notification equal to the value of the Notification address field. At step 1905, construct a new string (the Notification Data String), consisting of the Notification type, number of associated partitions, the set of associated partition IDs, and the application-defined data, all from the Notification. This implementation uses a newline character to separate each component of the string, and uses the standard C library call sprint() to define the contents of the new string.

At step 1907, assign the ASCII string of the os_notification equal to the Notification Data String, using os_notification::assign(). At step 1909, send the os_notification using the ObjectStore send procedure (os_notification::notify_immediate() or os_notification::notify_on_commit()).

It will be noted that, regarding step 1905, if the Notification's object_id field is blank, the resulting string will be a newline character followed by the value of the Notification's data field. If the data field is also blank, the resulting string will be composed of a single newline character. In all cases, strings are terminated by the C/C++ required null character.

Figure 20A:
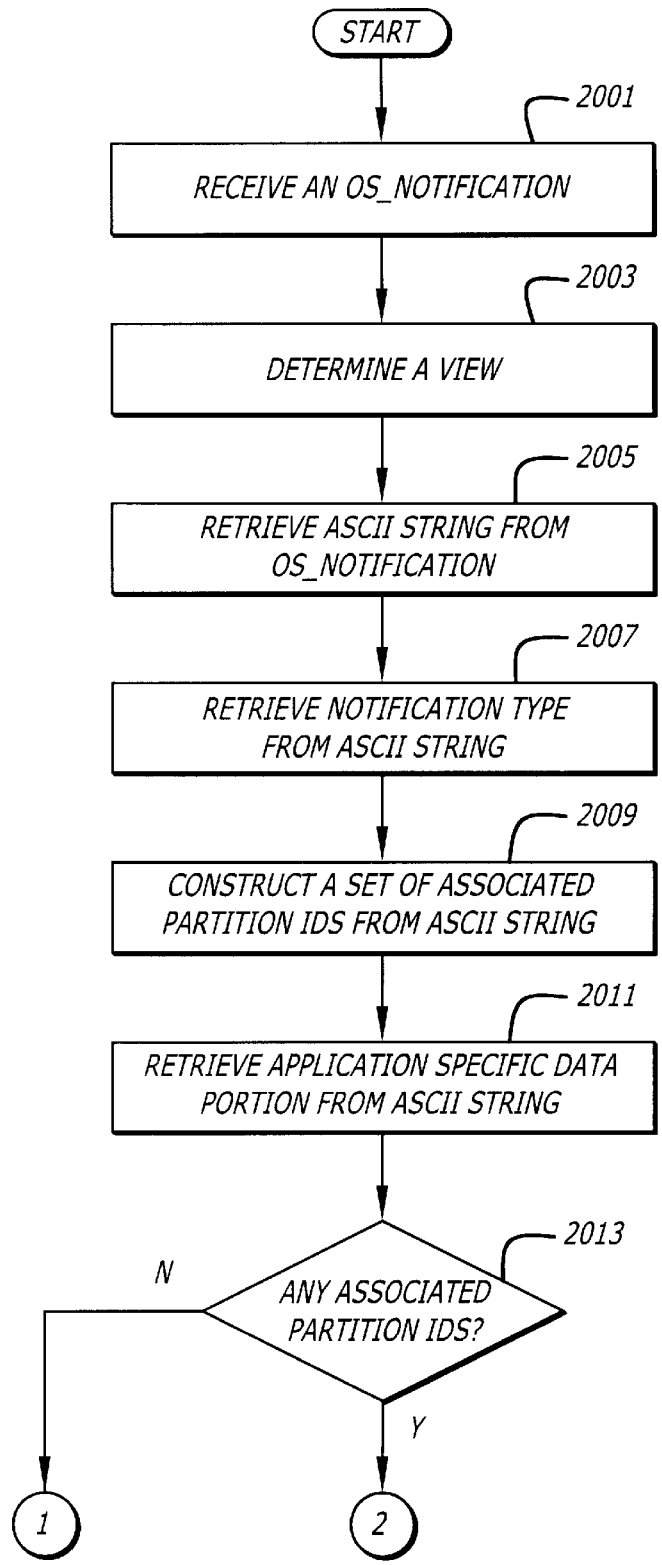
FIGS. 20A–20B show a flowchart for implementing second-stage filtering compatible with the present invention.
Figure 20B:
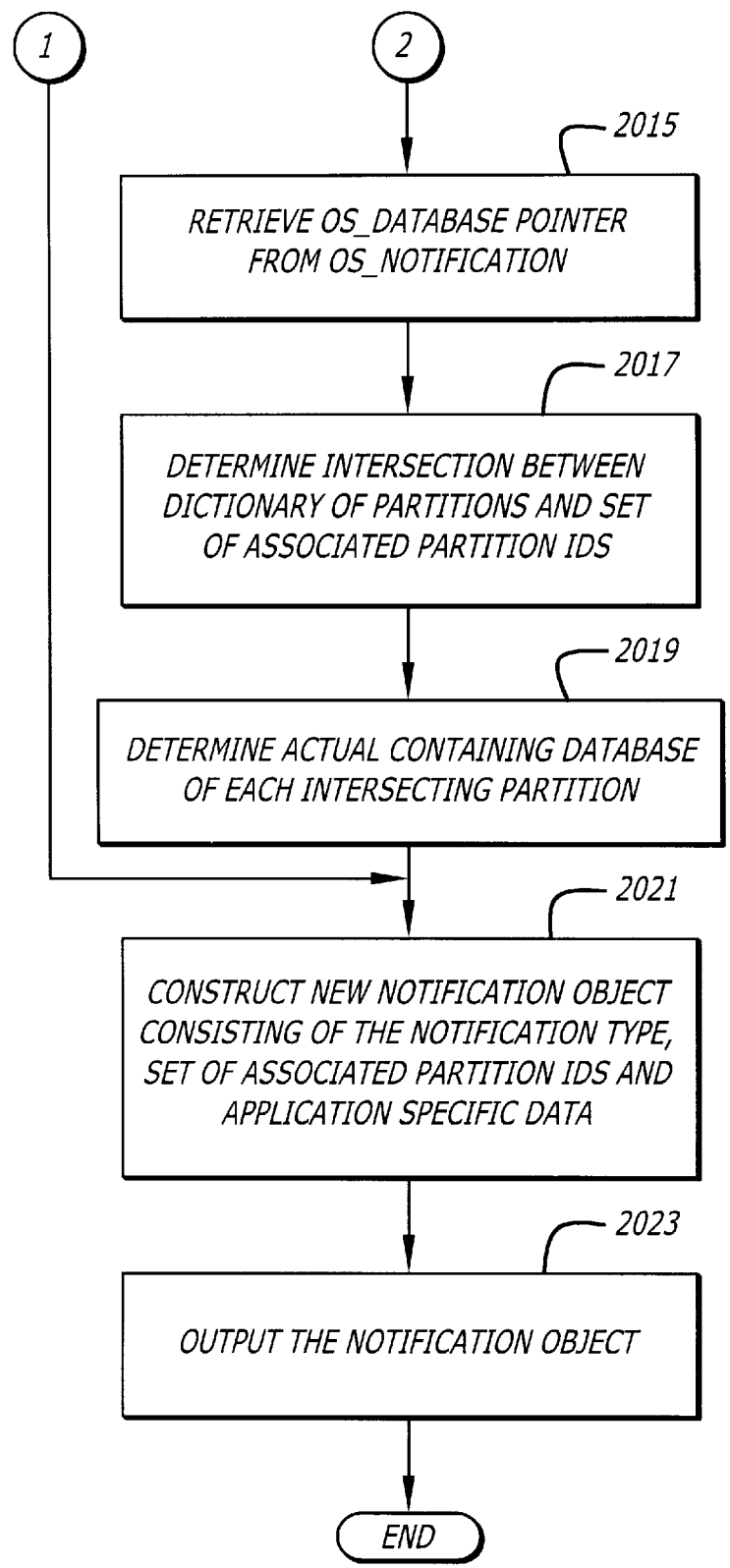

FIG. 20 shows a method for implementing second-stage filtering described above. If there is an intersection of partitions, it means that one or more of the Partitions associated with the Notification is in the view, and thus the Notification is in the view. If there is no intersection, then the Notification is not in the view, and it can be discarded. At step 2001, call the ObjectStore notification receive method to receive an os_notification. At step 2003, determine a view as described above and as shown in FIGS. 5A–5B. Step 2003 outputs a PartitionsInView object with a set of databases and a set of partitions. The set of databases is implemented with an array and has a determinate order. Assume that each database in the set of databases exists and is open.

At step 2005, retrieve the ASCII string from the os_notification using os_notification::get_string(). At step 2007, retrieve the Notification type from the ASCII string. At step 2009, construct a Set of associated partition IDs from the ASCII string. One implementation uses simple character parsing, which looks for newline characters to determine the separate components of the input ASCII string. The number of associated partitions in the ASCII string is determined by the count of partitions, embedded in the ASCII string.

At step 2011, retrieve the application-specific data portion from the ASCII string. If at step 2013 there are no associated partition ID's with this notification, it is construed as meaning that the notification is not restricted to the view of any partitions—and thus by definition, in view. Control is transferred to step 2021.

At step 2015, retrieve the os_database pointer from the os_notification, using os_notification::get_database(). The os_database pointer uniquely identifies a single ObjectStore database, even across a network of machines. Since a single Database object is stored in each ObjectStore database, the os_database pointer is an efficient way to perform comparisons. ObjectStore knows which os_database the os_notification originated from based on the database address against which the os_notification was sent.

At step 2017, determine the intersection between the Dictionary of partitions in view (the partitions field in the ParititionsInView object) and the set of associated partition ID's retrieved from the notification. An intersection is defined as one or more partitions in view having the same Partition ID value, as one of the Partition ID's in the notification.

At step 2019, determine the actual containing database of each intersecting Partition in view, and compare to the originating database of the notification. This may be performed by comparing os_database values. For each Partition in the view which is a member of the intersection set as determined in the previous step:

i. Determine the os_database of the Partition in view. This may be performed by calling the ObjectStore function os_database::of(), using the Partition as input. This function returns an os_database pointer which uniquely identifies the os_database (and thus Database) of origin of the Partition.

ii. Compare the os_database of the Partition, to the os_database of the notification as determined at step 2013.

iii. If the os_database values match, proceed to the next step.

iv. If the os database values do not match, discard this notification. It is not in view. Return control to step 2001.

At step 2021, construct a new Notification object consisting of the Notification type, Set of associated partition ID's, and application-specific data. At step 2023, output the Notification object.

While the disclosed technology is described in terms of embodiments in a specific system environment, those of ordinary skill in the art will recognize that the disclosed technology can be practiced, with modification, in other and different hardware and software environments within the spirit and scope of the appended claims.

What is claimed is:

1. A method for enabling a view of data across a database comprising the steps of:
   receiving the database containing data to be viewed;
   logically partitioning the database into a partition based upon a characteristic of the data to be viewed, the partition having a partition viewage table and a set of objects;
   defining an entry point in the database for the view of data, the entry point having an entry point viewage table; and
   enabling the view of data by generating a set of partitions by recursively following the entry point viewage table and the partition viewage table to referenced partitions.

2. The method of claim 1 wherein the step of logically partitioning the database comprises the step of logically partitioning the database into multiple partitions across multiple independent databases.

3. The method of claim 1 wherein the step of logically partitioning the database comprises the step of dynamically partitioning the database.

4. The method of claim 1 wherein the step of logically partitioning the database comprises the step of statically partitioning the database.

5. The method of claim 1 wherein the partition viewage table comprises a partition viewage table having an entry, the entry having a machine identifier, a database identifier, and a partition identifier.

6. The method of claim 1 wherein the entry point viewage table comprises an entry point viewage table having an entry, the entry having a machine identifier, a database identifier, and a partition identifier.

7. The method of claim 1 wherein the set of objects comprises a data object selected from the group comprising router, hub, switch, bridge, network, partition, workstation, server, agent, link, local area network, wide area network, probe, modem, ATM circuit, VLAN, switch, community, subnet.

8. An apparatus for enabling a view of data across a database comprising:
   a database receiver to receive the database containing data to be viewed;
   a partitioner coupled to the database receiver to logically partition the database into a partition based upon a characteristic of the data to be viewed, the partition having a partition viewage table and a set of objects;
   an entry point definer coupled to the partitioner to define an entry point in the database for the view of data, the entry point having an entry point viewage table; and
   a view enabler coupled to the entry point definer and the partitioner to enable the view of data by generating a set of partitions by recursively following the entry point viewage table and the partition viewage table to referenced partitions.

9. The apparatus of claim 8 wherein the partitioner comprises a partitioner to logically partition the database into multiple partitions across multiple independent databases.

10. The apparatus of claim 8 wherein the partitioner comprises a partitioner to dynamically partition the database.

11. The apparatus of claim 8 wherein the partitioner comprises a partitioner to statically partition the database.

12. The apparatus of claim 8 wherein the partition viewage table comprises a partition viewage table having an entry, the entry having a machine identifier, a database identifier, and a partition identifier.

13. The apparatus of claim 8 wherein the entry point viewage table comprises an entry point viewage table having an entry, the entry having a machine identifier, a database identifier, and a partition identifier.

14. The apparatus of claim 8 wherein the set of objects comprises a data object selected from the group consisting of: a router, a hub, a switch, a bridge, a network, a partition, a workstation, a server, an agent, link, a local area network, a wide area network, a probe, a modem, an ATM circuit, a VLAN, a switch, a community, and a subnet.

15. A computer readable program product, comprising: a computer usable medium having computer readable program code embodied in the medium for use in a computer system to enable a view of data across a database, the computer readable program product comprising:
   computer readable program code to cause a computer to receive a database containing data to be viewed;
   computer readable program code to cause the computer to logically partition the database into a partition based upon a characteristic of the data to be viewed, the partition having a partition viewage table and a set of objects;
   computer readable program code to cause the computer to define an entry point in the database for the view of data, the entry point having an entry point viewage table; and
   computer readable program code to cause a computer to enable the view of data by generating a set of partitions by recursively following the entry point viewage table and the partition viewage table to referenced partitions.

16. The computer readable program product of claim 15 wherein the computer readable program code to cause a computer to logically partition the database comprises computer readable program code to cause a computer to logically partition the database into multiple partitions across multiple independent databases.

17. The computer readable program product of claim 15 wherein the computer readable program code to cause a computer to logically partition the database comprises computer readable program code to cause a computer to dynamically partition the database.

18. The computer readable program product of claim 15 wherein the computer readable program code to cause a computer to logically partition the database comprises computer readable program code to cause a computer to statically partition the database.

19. The computer readable program product of claim 15 wherein the partition viewage table comprises a partition viewage table having an entry, the entry having a machine identifier, a database identifier, and a partition identifier.

20. The computer readable program product of claim 15 wherein the entry point viewage table comprises an entry point viewage table having an entry, the entry having a machine identifier, a database identifier, and a partition identifier.

21. The computer readable program product of claim 15 wherein the set of objects comprises a data object selected from the group consisting of: a router, a hub, a switch, a bridge, a network, a partition, a workstation, a server, an agent, a link, a local area network, a wide area network, a probe, a modem, an ATM circuit, a VLAN, a switch, a community, and a subnet.

22. A method comprising:
receiving a unique subset of available data in a database having zero or more partitions;
logically generating at least one further partition in the database based upon a characteristic of data to be viewed; and
displaying a viewage table having a list of partitions in view to give users access to the unique subset of available data.

23. The method of claim 22, wherein the unique subset of available data is from multiple independent databases.

24. The method of claim 22, wherein each partition comprises a set of objects selected from the group comprising a router, a hub, a switch, a bridge, a network, a workstation, a server, an agent, a link, a local area network, a wide area network, a probe, a modem, an ATM circuit, a VLAN, a community, and a subnet.

25. An apparatus comprising:
a database receiver to receive a unique subset of available data in a database having zero or more partitions;
a partitioner coupled to the database to logically generate at least one further partition in the database based upon a characteristic of data to be viewed; and
a view enabler to display a viewage table having a list of partitions in view to give users access to the unique subset of available data.

26. The apparatus of claim 25, wherein the unique subset of available data is from multiple independent databases.

27. The apparatus of claim 25, wherein each partition comprises a set of objects selected from the group comprising a router, a hub, a switch, a bridge, a network, a workstation, a server, an agent, a link, a local area network, a wide area network, a probe, a modem, an ATM circuit, a VLAN, a community, and a subnet.

28. An article of manufacture comprising:
computer readable program code to receive a unique subset of available data in a database having zero or more partitions;
computer readable program code to logically generate at least one further partition in the database based upon a characteristic of data to be viewed; and
computer readable program code to display a viewage table having a list of partitions in view to give users access to the unique subset of available data.

29. An article of manufacture of claim 28, wherein the unique subset of available data is from multiple independent databases.

30. An article of manufacture of claim 28, wherein each partition comprises a set of objects selected from the group comprising a router, a hub, a switch, a bridge, a network, a workstation, a server, an agent, a link, a local area network, a wide area network, a probe, a modem, an ATM circuit, a VLAN, a community, and a subnet.

* * * * *